(12) United States Patent
Kato et al.

(10) Patent No.: US 12,271,551 B2
(45) Date of Patent: Apr. 8, 2025

(54) POSITION DETECTING DEVICE AND INFORMATION PROCESSING SYSTEM

(71) Applicant: Wacom Co., Ltd., Saitama (JP)

(72) Inventors: So Kato, Saitama (JP); Tomo Asakura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/180,050

(22) Filed: Mar. 7, 2023

(65) Prior Publication Data

US 2023/0297187 A1     Sep. 21, 2023

(30) Foreign Application Priority Data

Mar. 15, 2022  (JP) ................................ 2022-039796

(51) Int. Cl.
| | | |
|---|---|---|
| *G06F 3/041* | (2006.01) | |
| *G06F 3/0354* | (2013.01) | |
| *G06F 3/046* | (2006.01) | |

(52) U.S. Cl.
CPC ...... *G06F 3/04166* (2019.05); *G06F 3/03545* (2013.01); *G06F 3/046* (2013.01)

(58) Field of Classification Search
None
See application file for complete search history.

(56) References Cited

U.S. PATENT DOCUMENTS

| | | | | |
|---|---|---|---|---|
| 2007/0211038 A1* | 9/2007 | Tsai | ...................... | G06F 1/1632 345/173 |
| 2008/0042985 A1* | 2/2008 | Katsuhito | ............. | G06F 3/0446 345/173 |
| 2009/0140998 A1* | 6/2009 | Jung | ...................... | G06F 3/0488 345/173 |
| 2013/0050122 A1* | 2/2013 | Kang | ...................... | G06F 3/041 345/173 |
| 2016/0282985 A1* | 9/2016 | Marques | ............... | G06F 3/0446 |
| 2021/0019010 A1* | 1/2021 | Yoganandan | ......... | G06F 3/0416 |

FOREIGN PATENT DOCUMENTS

| | | |
|---|---|---|
| JP | H10198490 A | 7/1998 |
| JP | H11134101 A | 5/1999 |
| JP | 2021095521 A | 6/2021 |

* cited by examiner

*Primary Examiner* — Nicholas J Lee
(74) *Attorney, Agent, or Firm* — Seed IP Law Group LLP

(57) ABSTRACT

A position detecting circuit detects an indicated position on an input surface of a sensor as absolute coordinates. A relative coordinate calculating circuit which, in operation, sequentially obtains the absolute coordinates from the position detecting circuit and calculates relative coordinates indicating the position indicated by an indicator on the input surface, from a difference between previous absolute coordinates and present absolute coordinates. An output absolute coordinate value calculating circuit which, in operation, assumes that an indication input is performed on an input area positioned on an output absolute coordinate region corresponding to a display screen, and calculates an output absolute coordinate value of the indicated position corresponding to the indication input by using the relative coordinates from the relative coordinate calculating circuit. The calculated output absolute coordinate value is output through an output circuit.

10 Claims, 13 Drawing Sheets

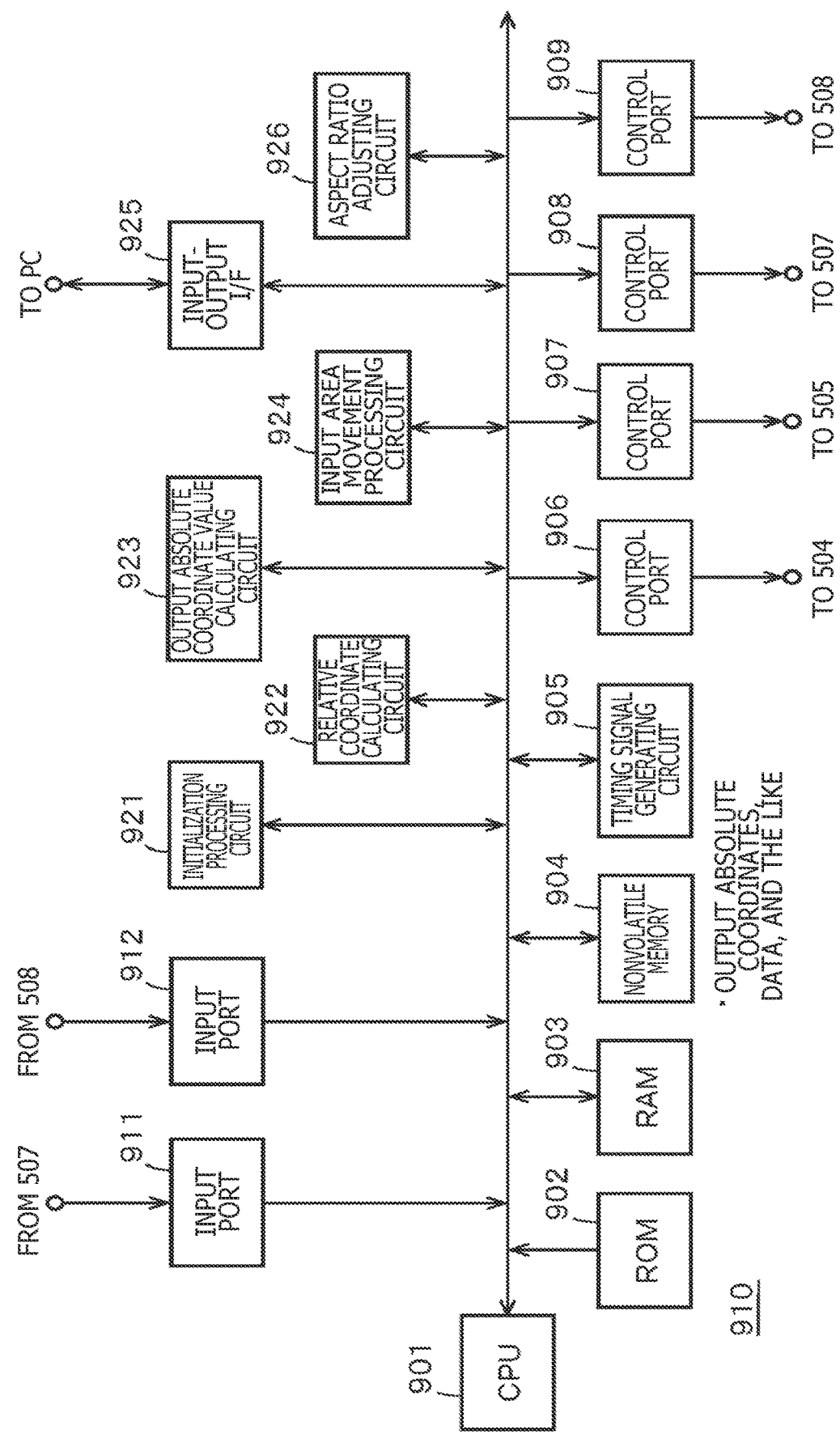

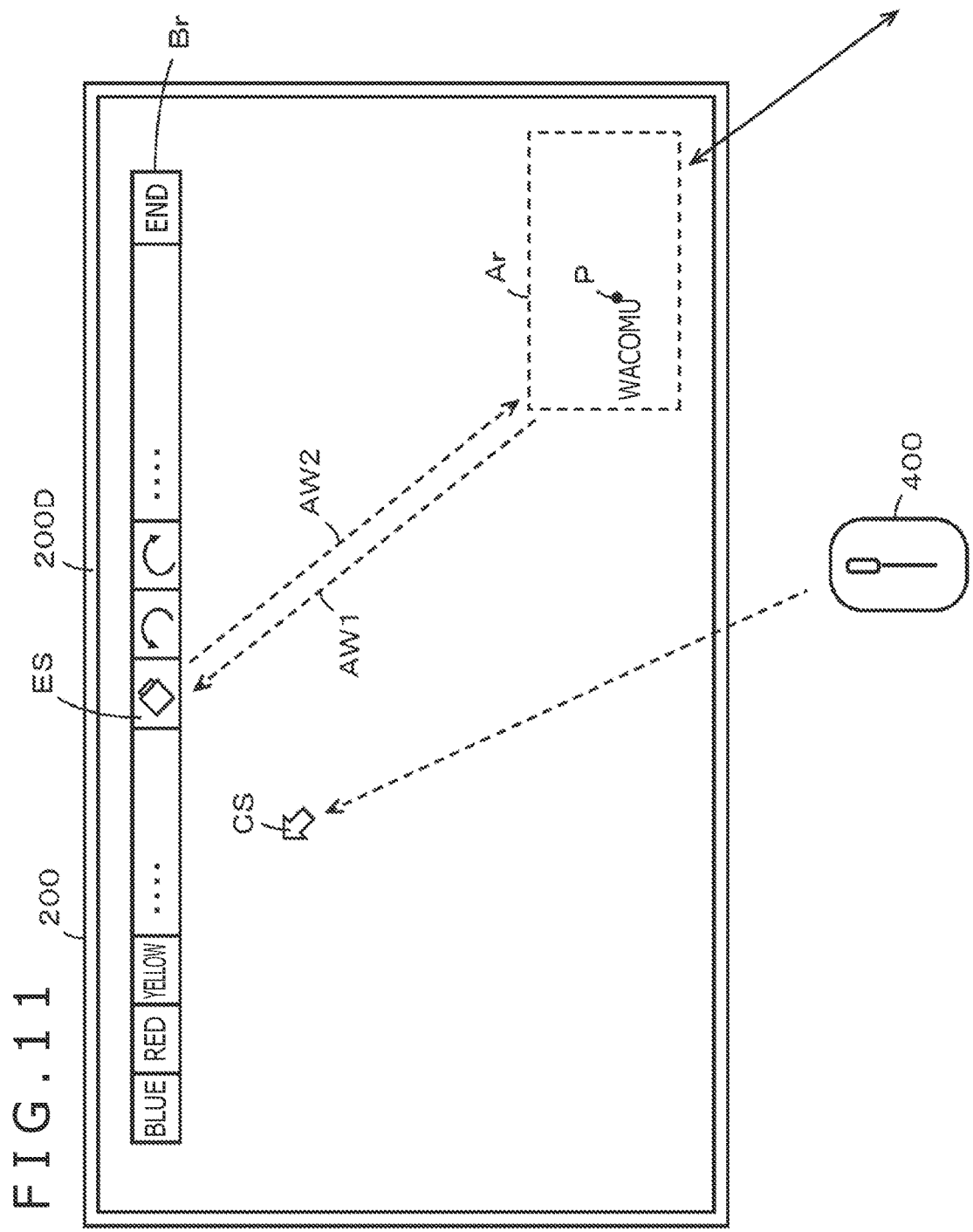

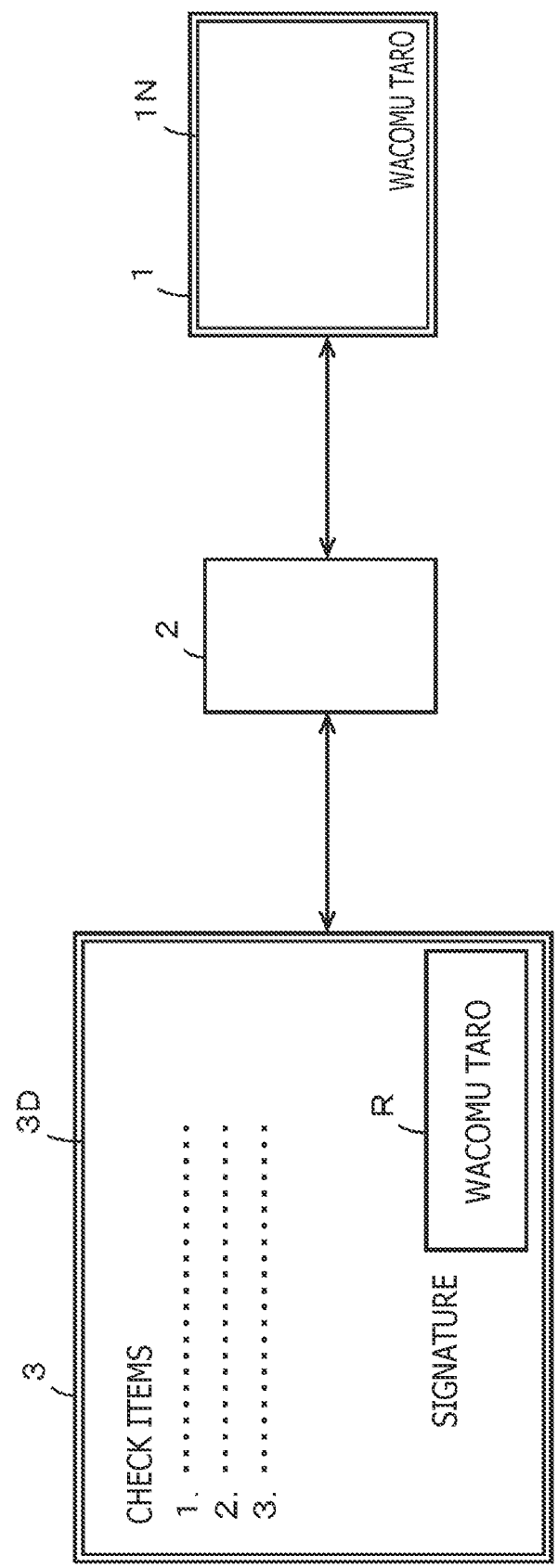

POSITION DETECTING DEVICE AND INFORMATION PROCESSING SYSTEM

BACKGROUND

Technical Field

The present disclosure relates to, for example, a position detecting device that detects information such as a position indicated by an indicator such as an electronic pen and that supplies the detected information to an information processing device, and an information processing system configured using the position detecting device.

Description of the Related Art

A position detecting device is widely used which reads a position indicated by an indicator such as an electronic pen on a plate-shaped body, by using a position detecting sensor included in the plate-shaped body, and which provides the indicated position to an information processing device such as a personal computer (PC) main unit. The position detecting device is generally referred to as a pen tablet or a plate tablet, or simply referred to as a tablet. Also in the present specification, the position detecting device of the plate-shaped body will hereinafter be described as a tablet. A PC includes a human interface device (HID)-compliant standard driver, so that a computer peripheral device such as the tablet can easily be used in a state of being connected to the PC. Incidentally, the HID is a general term for devices in charge of a man-machine interface among computer peripheral devices and the like, and refers to a keyboard, a pointing device such as a tablet or a mouse, various game controllers, various operating buttons and knobs, a remote control, and the like.

As disclosed in Japanese Patent Laid-Open Nos. H10-198490 and H11-134101, the tablet detects a position indicated by the indicator on the position detecting sensor as absolute coordinates and outputs the absolute coordinates. Therefore, the HID-compliant standard driver for the tablet receives the absolute coordinates from the tablet and processes the absolute coordinates. For the absolute coordinates, an origin is set, and the absolute coordinates indicate a position by a distance from the origin. FIGS. 12A and 12B are diagrams illustrating a conventional information processing system including a tablet 1, a PC 2, and a display 3. Consideration will be given to a case where, as illustrated in FIG. 12A, for example, an indicated position is notified from the tablet 1 to the PC 2 by using absolute coordinates when an input surface 1N of the tablet 1 and a display screen 3D of the display 3 connected to the PC 2 are in a congruent or similar relation to each other.

In general, the whole of the input surface 1N of the tablet 1 is associated with the whole of the display screen 3D of the display 3 connected to the PC. In this case, a congruent or similar relation can hold between a picture, a character, or the like drawn on the input surface 1N of the tablet 1 and a picture, a character, or the like correspondingly displayed on the display screen 3D of the display 3. That is, an input position and a display position match each other, and the shape of input information and the shape of display information match each other. Thus, with a feeling as in a case of handwriting on paper, information rendered through the input surface 1N of the tablet 1 can be rendered and input without a feeling of strangeness while the information is checked through the display screen 3D of the display 3.

In recent years, there has been a practice of using a display having a vertically long or horizontally long display screen, or forming one display screen by display screens of a plurality of displays by adding an external display to the PC. As illustrated in FIG. 12B, for example, suppose that a display screen 3AD of a display 3A connected to the PC 2 is a horizontally long display screen that is not in a congruent or similar relation to the input surface 1N of the tablet 1. Also in this case, the whole of the input surface 1N of the tablet 1 is associated with the whole of the display screen 3AD of the display 3A. Therefore, when a large character "A" is rendered on the input surface 1N of the tablet 1, as illustrated in FIG. 12B, the character "A" displayed on the display screen 3AD of the display 3A may be elongated horizontally because the display screen 3AD of the display 3A is horizontally long.

When the indicated position based on absolute coordinates is thus supplied from the tablet to the PC main unit, and the input surface of the tablet and the display screen of the display connected to the PC are not congruent or similar to each other, a feeling of strangeness may be caused. That is, a rendering input cannot be performed appropriately because a picture, a character, or the like drawn on the input surface of the tablet cannot be displayed on the display screen of the display as imagined by a user who performs the rendering input. Accordingly, the indicated position may be provided to the PC on the basis of relative coordinates. The relative coordinates are coordinates indicating a position by a relative relation to a specific point (any point). In Japanese Patent Laid-Open No. H10-198490, the relative coordinates are described as a value obtained by subtracting absolute coordinates obtained before a change in a unit time from absolute coordinates obtained after the change. That is, the relative coordinates can be expressed as an amount of change per unit time.

However, as described above, the HID-compliant standard driver for the tablet receives and processes absolute coordinates from the tablet, and therefore cannot receive and process the relative coordinates. Hence, as disclosed in Japanese Patent Laid-Open No. H10-198490, a HID-compliant standard driver for what is generally called a mouse may be used. This is because the HID-compliant standard driver for the mouse can obtain and process the relative coordinates from the mouse. However, the HID-compliant standard driver for the mouse is only for the mouse, and therefore cannot obtain and process pen pressure information of an electronic pen as an indicator, the pen pressure information being important information in an input system using the tablet.

Accordingly, a dedicated driver for the tablet which driver can process the relative coordinates may be used. However, even though the HID-compliant standard driver for the tablet which driver functions stably is prepared, it is necessary to obtain the dedicated driver by, for example, downloading the dedicated driver from a predetermined server on the Internet, install the dedicated driver, and set the dedicated driver in an operable state. Downloading and installing the dedicated driver may not be a problem in a case of a user accustomed to computers, but is troublesome work for a user unaccustomed to computers.

In recent years, due partly to digital transformation, there have been increasing cases where data is desired to be added by a direct handwriting input that is made to data input to the PC. FIG. 13 is a diagram illustrating an example of a case where data is desired to be added by a handwriting input. For example, there is a case where "check items" as data input to the PC 2 in advance are displayed on the display screen 3D of the display 3 and thereby presented to a person, and when the person confirms the check items, the person is desired to perform a handwriting input of his/her name to leave evidence of the confirmation. While such a confirmation process is conventionally performed through a document, the data can be stored and managed by the PC by being digitized and can also be output for printing as required, which is convenient.

However, a conventional tablet assumed also for an illustration purpose has a large size, and a large occupancy space is needed to install this conventional tablet. In addition, for the convenience of writing work, the conventional tablet having a large size needs to be placed at a position of best workability between the display and the user on a desk. Therefore, when a keyboard and a mouse are desired to be used in combination, a place for positioning these peripheral devices becomes a problem. In addition, as also described above, in general, the whole of the input surface 1N of the tablet 1 is associated with the whole of the display screen 3D of the display 3. Therefore, as illustrated in FIG. 13, in a case where an input range display area (display section) R for a signature is provided at the lower right of the display screen 3D, also on the input surface 1N of the tablet 1, only a very limited part at the lower right of the input surface 1N can be used for input. In this case, an input of a small character is forced, and the input is thus difficult. In addition, in this case, as also described above, when the display screen 3D and the input surface 1N are not in a congruent or similar relation to each other, a display image may be distorted unnaturally, and consequently cause a feeling of strangeness.

In consideration of the above, in a case where a purpose of handwriting input is the input of auxiliary information such as a note or what is generally called a sketch such as a schematic diagram or a configuration diagram or the input of a signature, the conventional tablet having a large size is not necessary, but a small tablet suffices. However, even when the tablet is simply miniaturized, the display image may be distorted in a case where the whole of the input surface of the tablet is associated with the whole of the display screen of the display as described above. In addition, as described with reference to FIG. 13, in a case where input information is desired to be displayed on a part of the display screen 3D, only a small part of the input surface 1N of the tablet 1 is usable for input, and therefore fine input work needs to be performed. Consequently, usability is rather degraded.

BRIEF SUMMARY

In view of the above, the present disclosure provides a miniaturized tablet with good usability and an information processing system using the miniaturized tablet. In particular, it is an object of the present disclosure to enable even information input to a part of a display screen to be performed with use of the whole of an input surface without a need for a dedicated driver, and prevent occurrence of an inconvenience such as a display distortion.

In order to solve the above-described problems, there is provided a position detecting device including a sensor including a plurality of first electrodes arranged in a first direction, a plurality of second electrodes arranged in a second direction intersecting the first direction, and an input surface having a predetermined area, the input surface, in operation, receives a position indication signal from an indicator, a position detecting circuit which, in operation, detects an indicated position corresponding to an indication input performed by the indicator on the input surface, as absolute coordinates with a predetermined position on the input surface as an origin, based on output signals from the plurality of first electrodes and the plurality of second electrodes, a relative coordinate calculating circuit which, in operation, sequentially obtains the absolute coordinates from the position detecting circuit and calculates relative coordinates as a difference between previous absolute coordinates and present absolute coordinates, an output absolute coordinate value calculating circuit which, in operation, assumes that the indication input is performed on an input area corresponding to the input surface, the input area being an area positioned on a predetermined output absolute coordinate region corresponding to a display screen of a display device, and calculates an output absolute coordinate value of the indicated position corresponding to the indication input by using the relative coordinates from the relative coordinate calculating circuit, and an output circuit which, in operation, outputs the output absolute coordinate value calculated by the output absolute coordinate value calculating circuit.

According to this position detecting device, based on the output signals from the plurality of first electrodes and the plurality of second electrodes of the sensor, the position detecting circuit detects, as absolute coordinates, the position indicated by the indicator on the input surface of the sensor. The relative coordinate calculating circuit sequentially obtains the absolute coordinates from the position detecting circuit and calculates the relative coordinates indicating the position indicated by the indicator on the input surface from the difference between the previous absolute coordinates and the present absolute coordinates.

The output absolute coordinate value calculating circuit assumes that the indication input is performed on the input area positioned on the predetermined output absolute coordinate region corresponding to the display screen of the display device, and calculates the output absolute coordinate value of the indicated position corresponding to the indication input by using the relative coordinates from the relative coordinate calculating circuit. The input area is an area corresponding to the input surface of the sensor. The output circuit outputs the present output absolute coordinate value calculated by the output absolute coordinate value calculating circuit.

BRIEF DESCRIPTION OF THE SEVERAL VIEWS OF THE DRAWINGS

FIG. 6 is a block diagram of assistance in explaining an example of a configuration of a processing control unit of a position detecting circuit of the tablet according to an embodiment of the present disclosure;

FIG. 11 is a diagram of assistance in explaining a combined use of the tablet and a mouse in the information processing system according to an embodiment of the present disclosure;

FIG. 13 is a diagram illustrating an example of a case where data is desired to be added by a handwriting input.

DETAILED DESCRIPTION

Figure 1:
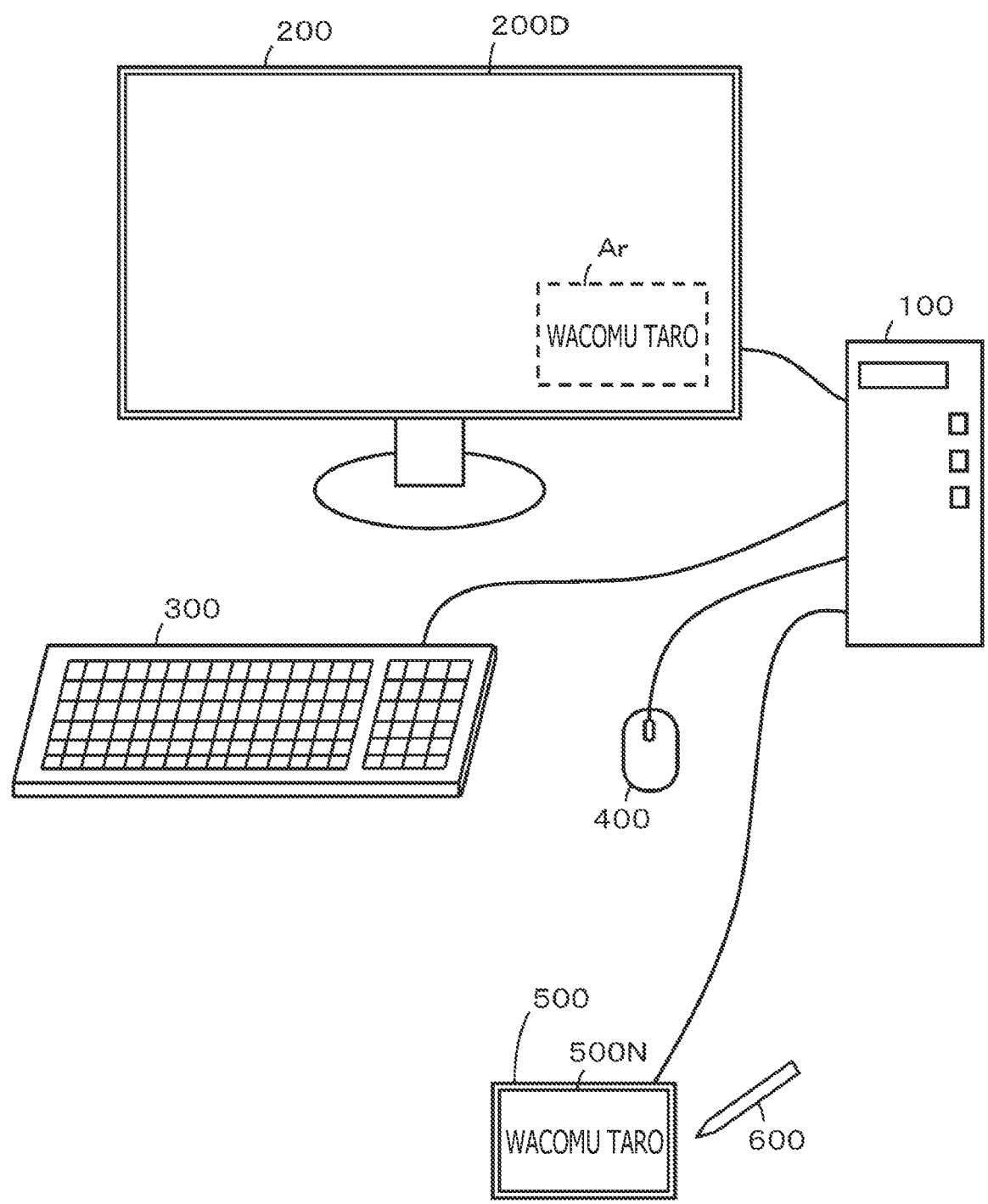
FIG. 1 is a diagram of assistance in explaining an example of a configuration of an information processing system that is configured using a tablet according to an embodiment of the present disclosure.

A device and a system according to an embodiment of the present disclosure will hereinafter be described with reference to the drawings. A tablet (position detecting device) according to the embodiment to be described in the following is, for example, used in a state of being connected to an information processing device such as a PC and functions as an input device of the information processing device such as a PC. The tablet according to the embodiment is, for example, a miniaturized tablet suitable for use in a case of inputting information in a partial region of a display screen, the information being auxiliary information such as a note or what is generally called a sketch such as a schematic diagram or a configuration diagram, a signature, or the like, as will be described later in detail.

Incidentally, there are various types of tablets, and tablets of an electromagnetic induction type and a capacitance type, for example, are widely used. In the electromagnetic induction type, a position detecting device includes a sensor unit in which a plurality of loop coils (electrodes) are arranged in each of an X-axis direction and a Y-axis direction. A transmission period in which a magnetic field is generated by sequentially supplying electric power to the plurality of loop coils of the sensor unit and a reception period in which the supply of the electric power is stopped and an external magnetic field is received are alternately provided. A corresponding electronic pen includes a resonance circuit formed by a coil and a capacitor. The electronic pen generates a signal when a current flows through the coil according to the magnetic field from the sensor unit. The electronic pen includes pen pressure information in this signal and transmits the signal to a position detecting sensor. This signal is received by the position detecting device in the reception period, and the position detecting device detects a position indicated by the electronic pen and a pen pressure.

In the capacitance type, the position detecting device includes a sensor unit in which a plurality of line electrodes (linear conductors) are arranged in each of the X-axis direction and the Y-axis direction. When a finger or a capacitance pen (electronic pen) is brought close to the sensor unit, the sensor unit detects an indicated position according to a change in capacitance (charge) which change occurs in the line electrodes. Incidentally, the capacitance pen includes a capacitance pen in a rod-shaped body which capacitance pen simply has conductivity and a capacitance pen that is driven by a battery and that sends out a signal (active capacitance pen). In a case of an active capacitive coupling type using the active capacitance pen, the capacitance pen includes pen pressure information in a signal from an oscillating circuit included in the capacitance pen and transmits the signal. This signal is received by the position detecting device, and the position detecting device detects an indicated position and a pen pressure.

The position detecting device according to the present disclosure can be configured as a position detecting device of an electromagnetic induction type (electro magnetic resonance (EMR) type) or can be configured as a position detecting device of an active capacitance type (active electrostatic (AES) type). In the following, in order to simplify description, description will be made by taking as an example a case where the present disclosure is applied to a position detecting device of the electromagnetic induction type.

Example of Configuration of Information Processing System

FIG. 1 is a diagram of assistance in explaining an example of a configuration of an information processing system that is configured using the tablet according to the embodiment. The information processing system as a whole is configured by connecting peripheral devices such as a display 200, a keyboard 300, a mouse 400, and a tablet 500 to a PC main unit 100. The PC main unit 100, the display 200, the keyboard 300, and the mouse 400 are each a commercially available ordinary one. As will be described later, the PC main unit 100 includes interfaces (I/F) for connecting the peripheral devices and various kinds of HID-compliant standard drivers (a keyboard driver, a mouse driver, a tablet driver, and the like) for making the peripheral devices function.

Thus, the PC main unit 100 can, for example, display various kinds of information or erase display on a display screen 200D of the display 200 connected to the own device. In addition, the PC main unit 100 can receive an input of information through the keyboard 300, display the received information, and perform processing according to the received information. Similarly, the PC main unit 100 can receive an indication input from the mouse 400, move a cursor displayed on the display screen 200D, receive an input of selecting a target item from a menu, and perform processing corresponding to the selected item. Incidentally, in the present embodiment, in order to simplify description, suppose that the display screen 200D of the display 200 is a 26-inch diagonal (inch) display screen having an aspect ratio of 16 to 9, for example. Hence, the vertical width of the display screen 200D is 323.6 mm, and the horizontal width of the display screen 200D is 574.5 mm.

The tablet 500 is a tablet of the electromagnetic induction type, as also described above. The tablet 500 receives an indication input using an electronic pen 600 of the electromagnetic induction type and supplies coordinate information corresponding to the indication input to the PC main unit 100. In addition, the tablet 500 is a miniaturized tablet. The area of a surface provided with an input surface (operation surface) 500N for receiving an operating input by the electronic pen 600 is very small, such as an A4 size, an A5 size, an A6 size, a B5 size, a B6 size, or a B7 size in terms of paper size. Incidentally, when each paper size is expressed by (short side×long side) mm, the A4 size is (210×297), the A5 size is (148×210), the A6 size is (148×105), the B5 size is (182×257), the B6 size is (128×182), and the B7 size is (128×91). Needless to say, the tablet 500 can be configured to be of various other sizes. A tablet of a small size as described above can be realized as a very thin type by a simple configuration, as disclosed in Japanese Patent Application No. 2021-95521, for example.

The input surface 500N of the tablet 500 according to the present embodiment is of a 6-inch size, which is approximately the B7 size. Therefore, when the tablet 500 is not used, the tablet 500 can be placed anywhere by, for example, being put aside to a right end side on a desk or being placed on the PC main unit 100. It is thus not difficult to find a storage space for the tablet 500. In addition, when the tablet 500 is used, a writing input can be performed while the tablet 500 is disposed at a position where the writing input using the electronic pen 600 is performed easily, the position being, for example, a position slightly in front of the right hand of a user, including a position on a keyboard or the like.

As also described above, the small tablet 500 is a miniaturized tablet suitable for inputting auxiliary information such as is displayed on a part of the display screen 200D of the display 200, the auxiliary information being, for example, a note, what is generally called a sketch such as a schematic diagram or a configuration diagram, a signature, or the like. Specifically, as illustrated in FIG. 1, consideration will be given to a case where an input range display area Ar for a signature is provided in a right lower end portion of the display screen 200D of the display 200. In this case, it is possible to receive a writing input of a signature by using the whole of the input surface 500N of the tablet 500, and make display corresponding to the writing input in the signature input range display area Ar of the display screen 200D.

As described above, the tablet 500 is a miniaturized tablet (the area of the input surface 500N is approximately the B7 size) rather than a conventionally existing tablet of a large size for illustration use. In addition, the whole of the input surface 500N of the tablet 500 does not correspond to the whole surface of the display screen 200D of the display 200. The input range display area Ar corresponding to the input surface 500N is provided in a target part of the display screen 200D, and input information corresponding to an input operation received through the whole of the input surface 500N can be displayed in the input range display area Ar.

Further, the tablet 500 according to the present embodiment enables processing using relative coordinates in such a manner that the input information corresponding to the input operation received through the input surface 500N is not distorted when displayed in the input range display area Ar. However, an HID-compliant tablet driver cannot handle relative coordinates, as also described above. Thus, a contrivance is made in such a manner that an HID-compliant standard tablet driver can be used. That is, while the tablet 500 enables processing using relative coordinates, the tablet 500 does not necessitate a dedicated driver, and the tablet 500 can be used by being easily connected to the PC main unit 100 by using the HID-compliant standard tablet driver.

Coordinate Transformation Processing Performed in Tablet 500

Figure 2:
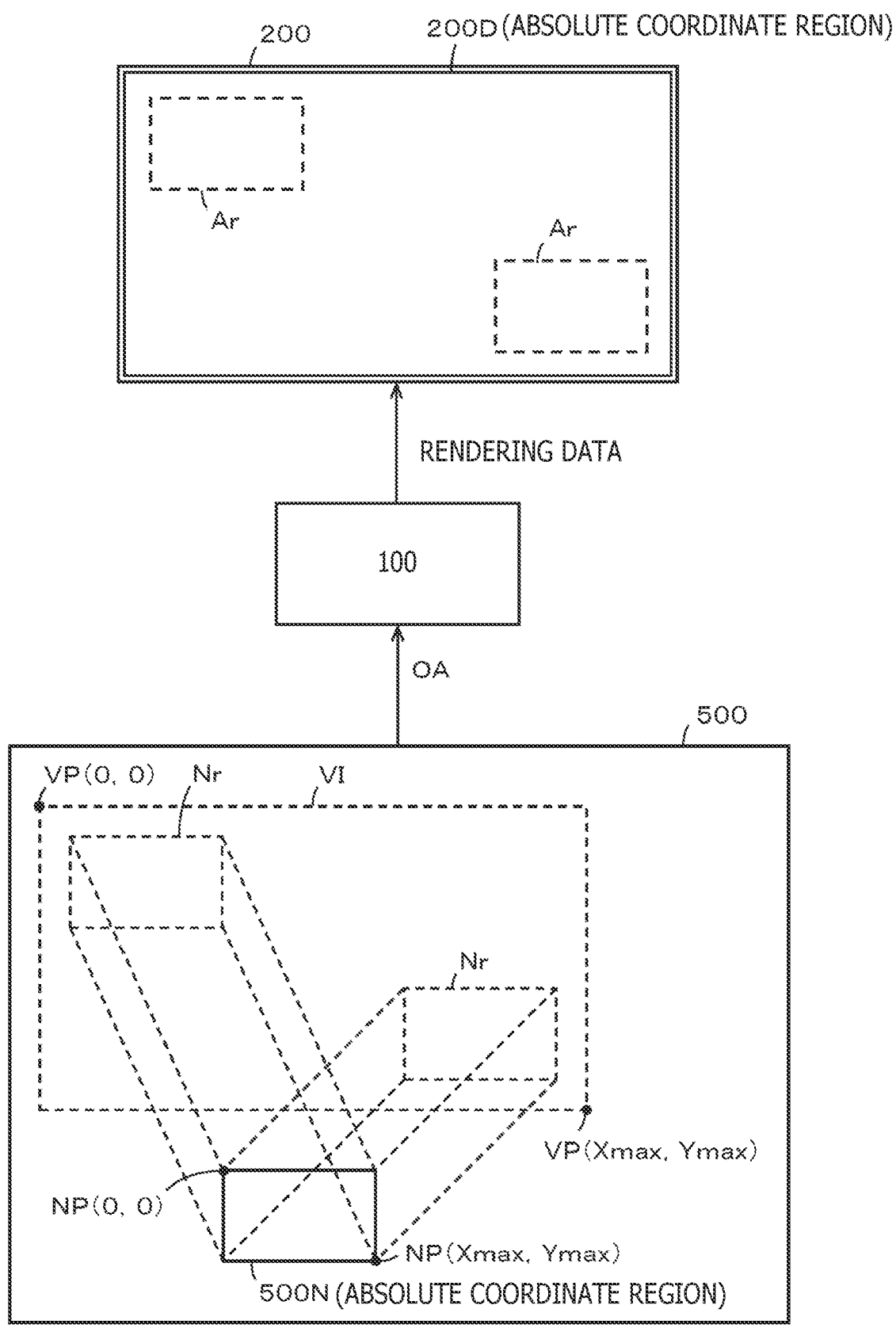
FIG. 2 is a diagram of assistance in explaining coordinate transformation processing performed in the tablet according to an embodiment of the present disclosure.

FIG. 2 is a diagram of assistance in explaining coordinate transformation processing performed in the tablet 500 of the embodiment. FIG. 2 illustrates a state in which the tablet 500 as an input device illustrated on a lower side is connected to the PC main unit 100, and the display 200 as a display device illustrated on an upper side is connected to the PC main unit 100. In the present embodiment, as also described above, the size of the display screen 200D of the display 200 is the 26-inch diagonal (26-inch) size, and the input surface 500N of the tablet 500 is of the B7 size, for example. Hence, the display screen 200D and the input surface 500N do not have a same size nor a same aspect ratio and are not in a congruent or similar relation to each other.

The input surface 500N of the tablet 500 is an absolute coordinate region having an origin NP (0, 0) at a left upper end portion (left corner portion) thereof and having a maximum value NP (Xmax, Ymax) at a right lower end portion (right corner portion) thereof. In the tablet 500 according to the present embodiment, for example, Xmax is 12236, and Ymax is 9059. However, as will be described later in detail, in the tablet 500, input information input through the input surface 500N is recognized on the basis of relative coordinates obtained by subtracting present absolute coordinates from previous absolute coordinates. That is, the input information is recognized as an amount of change from the previous absolute coordinates.

In addition, in the information processing system according to the present embodiment, unlike the conventional information processing system, the whole or a part of the input surface 500N of the tablet 500 is not associated with the whole surface of the display screen 200D of the display 200. As described with reference to FIG. 1, a writing input (position indication input) from the user can be received in such a manner that the whole of the input surface 500N of the tablet 500 is associated with a part of the display screen 200D of the display 200.

Specifically, as illustrated on the lower side of FIG. 2, the tablet 500 is provided with a virtual output absolute coordinate region VI as represented by a large dotted line quadrangle. The output absolute coordinate region VI is a virtual region associated with the display screen 200D of the display 200. As illustrated in FIG. 2, the output absolute coordinate region VI has an origin VP (0, 0) at a left upper end portion (left corner portion) thereof, and has a maximum value VP (Xmax, Ymax) at a right lower end portion (right corner portion) thereof. In the present embodiment, NP (Xmax, Ymax) and VP (Xmax, Ymax) are set to be the same value. However, VP (Xmax, Ymax) may be larger than NP (Xmax, Ymax), or operation is possible even when VP (Xmax, Ymax) is smaller than NP (Xmax, Ymax) though input data is thinned out. This resolution is a sufficiently higher value than the resolution of an ordinary monitor. The coordinate value of VI is transferred to the PC main unit 100, thereafter converted into a coordinate value matching the resolution of the display screen 200D within the PC main unit 100, and then output as rendering data.

On the virtual output absolute coordinate region VI represented by a large dotted line quadrangle in FIG. 2 in the tablet 500, an input area Nr corresponding to the input surface 500N is moved and positioned at a certain position. As represented by a dotted line quadrangle on the display screen 200D in FIG. 2, the input area Nr positioned at the certain position on the output absolute coordinate region VI corresponds to the input range display area Ar of information on the display screen 200D of the display 200. The output absolute coordinate region VI is a region associated with the display screen 200D of the display 200 and is first notified to the PC main unit 100. This is because display control of the display 200 is performed.

By performing an indication input to the input surface 500N of the tablet 500, the user can perform an indication input to the input area Nr positioned at the certain position of the output absolute coordinate region VI through the input surface 500N. The tablet 500 recognizes the indication input performed to the input surface 500N, as relative coordinates which are a difference value obtained by subtracting present absolute coordinates from previously detected absolute coordinates. Further, the tablet 500 converts the recognized relative coordinates into output absolute coordinates OA according to the position of the input area Nr positioned on the output absolute coordinate region VI, and the tablet 500 outputs the output absolute coordinates OA to the PC main unit 100.

Thus, in the PC main unit 100, the HID-compliant tablet driver functions on the basis of the output absolute coordinates OA from the tablet 500. Specifically, the PC main unit 100 forms rendering data on the basis of the output absolute coordinate value indicating a position on the output absolute coordinate region VI corresponding to the display screen 200D, and the PC main unit 100 outputs this rendering data to the display 200. Consequently, an image corresponding to the information input through the input surface 500N of the tablet 500 can be rendered and displayed in the input range display area Ar positioned at the certain position of the display screen 200D of the display 200.

Thus, the tablet 500 according to the present embodiment can display the information input by using the whole of the input surface 500N, on a target part of the display screen 200D of the display 200 (input range display area Ar as a part of the display screen 200D). In the following, specific description will be made of processing of moving the input area Nr corresponding to the input surface 500N of the tablet 500 on the output absolute coordinate region, an information input using the tablet 500, and display on the display screen 200D of the display 200.

Processing of Moving Input Area on Output Absolute Coordinate Region

FIGS. 3A to 3D are diagrams of assistance in explaining the processing of moving the input area Nr on the output absolute coordinate region VI which processing is performed in the tablet 500 according to the embodiment. Here, in order to simplify the description, the description will be made supposing that the output absolute coordinate region VI is a region of horizontal 900 pixels by vertical 500 pixels, and that the input surface 500N of the tablet 500 is a region of horizontal 250 pixels by vertical 150 pixels. Incidentally, these numerical values are an example for making the description specific and are generally larger values.

Figure 3A:
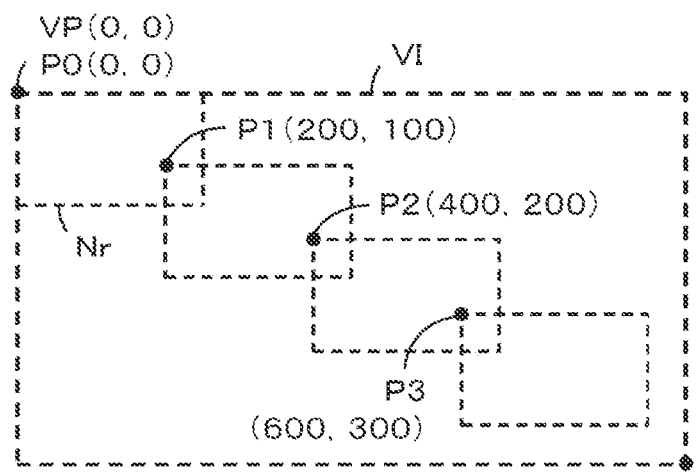
FIGS. 3A, 3B, 3C, and 3D are diagrams of assistance in explaining processing of moving an input area on an output absolute coordinate region which processing is performed in the tablet according to an embodiment of the present disclosure.

In the example illustrated in FIGS. 3A to 3D, suppose that the input area Nr corresponding to the input surface 500N of the tablet 500 is positioned at a left upper end portion of the output absolute coordinate region VI at a time of an initial state immediately after power to the tablet 500 is turned on. Hence, as illustrated in FIG. 3A, suppose that the origin VP (0, 0) of the output absolute coordinate region VI and an origin P0 (0, 0) of the input area Nr coincide with each other. Consideration will be given to moving the input area Nr to a right lower end portion of the output absolute coordinate region VI from a state in which the input area Nr is thus positioned at the left upper end portion of the output absolute coordinate region VI. As will be described in the following, the processing of moving the input area Nr is performed according to a linear distance including those of both a hovering movement and a writing movement from detection of the electronic pen 600 to non-detection of the electronic pen 600 and a non-detection moving operation.

Hovering or Writing Movement: Pen Point Movement within Region (Dotted Line Arrow H1)

Figure 3B:
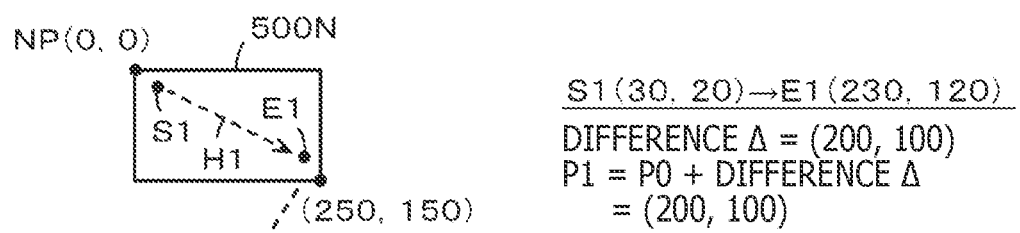

First, as illustrated in FIG. 3B, the user indicates a start point by making the pen point of the electronic pen 600 detected at a position S1 at a left upper end portion of the input surface 500N of the tablet 500. Next, the user sets what is generally called a hovering state in which the user floats the pen point of the electronic pen 600 and does not apply any pen pressure but the tablet 500 can recognize the position of the pen point of the electronic pen 600, or sets what is generally called a writing state in which the user brings the pen point into contact with the input surface 500N (applies a pen pressure). In these states, as indicated by a dotted line arrow H1 in FIG. 3B, the user moves the pen point of the electronic pen 600 to a position E1 at a right lower end portion of the input surface 500N. The user then indicates an end point by setting the pen point in a non-detected state. In this case, suppose that the absolute coordinates of the position S1 on the input surface 500N are (30, 20), and that the absolute coordinates of the position E1 on the input surface 500N are (230, 120).

A start position and an end position are indicated by making the pen point thus detected. An operation of hovering movement between the start position and the end position is assumed to be an operation of indicating the movement of the pen point within the input area Nr. In this case, as illustrated on the right side of FIG. 3B, a movement from the position S1 (30, 20) to the position E1 (230, 120) is performed, which constitutes an operation of indicating the movement of the pen point within the input area Nr by a difference Δ (200, 100), which is obtained by subtracting the position S1 from the position E1.

Non-Detection Movement: Region Movement (Dotted Line Arrow M1)

Figure 3C:
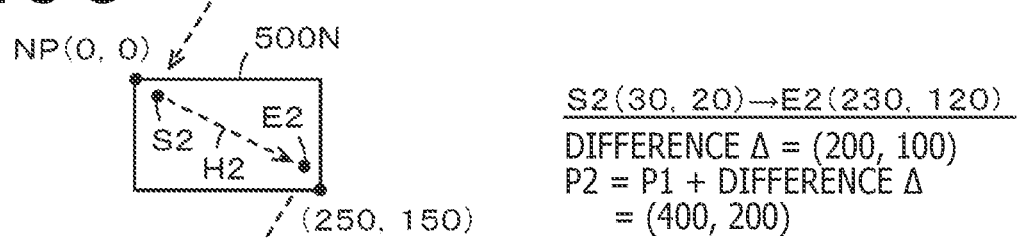

Next, the user moves the pen point of the electronic pen 600 away from the input surface 500N, to thereby set the pen point of the electronic pen 600 in a state undetectable by the tablet 500 (state that is not a writing state or a hovering state). While maintaining this state, the user moves the electronic pen 600 to the left upper end portion of the input surface 500N, as indicated by a dotted line arrow M1 between FIG. 3B and FIG. 3C. In this case, suppose that a position S2 on the input surface 500N, the position S2 being illustrated in FIG. 3C, is the same position as the position S1 on the input surface 500N, the position S1 being illustrated in FIG. 3B. As a result of the operations thus far, the input area Nr has been moved according to the moving indication of the pen point of the electronic pen 600. Hence, a new origin position P1 of the input area Nr, on the output absolute coordinate region VI, obtained after the movement is a position obtained by adding the difference Δ (200, 100) as relative coordinates to the origin P0 (0, 0) of the present input area on the output absolute coordinate region VI.

Specifically, as illustrated in FIG. 3A, the new origin position P1 of the input area Nr, on the output absolute coordinate region VI, obtained after the movement is (200, 100). Then, the coordinates of the position S2 in this case on the tablet (on the input surface 500N) are (30, 20), whereas the coordinates of the position S2 on the output absolute coordinate region VI are (230, 120). In addition, the coordinates of a position E2 in this case on the tablet (on the input surface 500N) are (230, 120), whereas the coordinates of the position E2 on the output absolute coordinate region VI are (430, 220).

Hovering or Writing Movement: Pen Point Movement within Region (Dotted Line Arrow H2)

As illustrated in FIG. 3C, the user repeats an operation similar to the operation illustrated in FIG. 3B. Specifically, the user indicates a start point by making the pen point of the electronic pen 600 detected at the position S2 at the left upper end portion of the input surface 500N of the tablet 500. Next, the user sets a hovering state by floating the pen point of the electronic pen 600 or sets what is generally called a writing state by bringing the pen point into contact with the input surface 500N (applying a pen pressure). In these states, as indicated by a dotted line arrow H2 in FIG. 3C, the user moves the pen point of the electronic pen 600 to the position E2 at the right lower end portion of the input surface 500N. The user then indicates an end point on the input surface 500N by setting the pen point in a non-detected state. Also in this case, suppose that the absolute coordinates of the position S2 on the input surface 500N are (30, 20), and that the absolute coordinates of the position E2 on the input surface 500N are (230, 120). Hence, as illustrated on the right side of FIG. 3C, a movement from the position S2 (30, 20) to the position E2 (230, 120) is performed, which constitutes an operation of indicating the movement of the pen point within the input area Nr by a difference Δ (200, 100), which is obtained by subtracting the position S2 from the position E2.

Non-Detection Movement: Region Movement (Dotted Line Arrow M2)

Figure 3D:
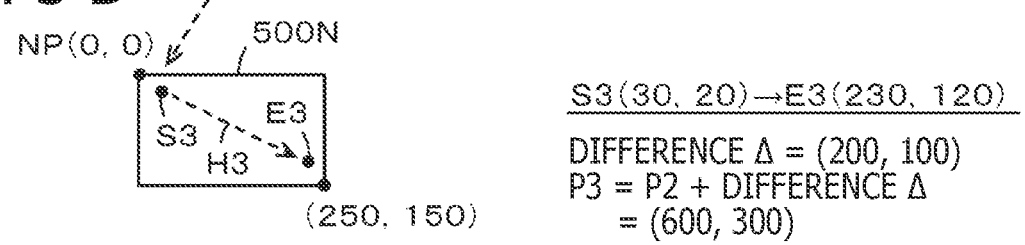

Next, the user moves the pen point of the electronic pen 600 away from the input surface 500N, to thereby set the pen point of the electronic pen 600 in a state undetectable by the tablet 500. The user then moves the pen point of the electronic pen 600 to the left upper end portion of the input surface 500N, as indicated by a dotted line arrow M2 between FIG. 3C and FIG. 3D. In this case, suppose that a position S3 on the input surface 500N, the position S3 being illustrated in FIG. 3D, is the same position as the positions S1 and S2 on the input surface 500N, the positions S1 and S2 being illustrated in FIGS. 3B and 3C. As a result of the operations thus far, the input area Nr has further been moved according to the moving indication of the pen point of the electronic pen 600. Hence, a new origin position P2 of the input area Nr, on the output absolute coordinate region VI, obtained after the movement is a position obtained by adding a difference Δ (200, 100) as relative coordinates to the origin P1 (200, 100) of the present input area on the output absolute coordinate region VI.

Specifically, as illustrated in FIG. 3A, the new origin position P2 of the input area Nr, on the output absolute coordinate region VI, obtained after the movement is (400, 200). Then, the coordinates of the position S3 at this time on the tablet (on the input surface 500N) are (30, 20), whereas the coordinates of the position S3 on the output absolute coordinate region VI are (430, 220). In addition, the coordinates of a position E3 on the output absolute coordinate region VI are (630, 320).

Hovering or Writing Movement: Pen Point Movement within Region (Dotted Line Arrow H3)

As illustrated in FIG. 3D, the user repeats an operation similar to the operation illustrated in FIGS. 3B and 3C. Specifically, the user indicates a start point by making the pen point of the electronic pen 600 detected at the position S3 at the left upper end portion of the input surface 500N of the tablet 500. Next, the user sets a hovering state by floating the pen point of the electronic pen 600 or sets what is generally called a writing state by bringing the pen point into contact with the input surface 500N (applying a pen pressure). In these states, as indicated by a dotted line arrow H3 in FIG. 3D, the user moves the pen point of the electronic pen 600 to the position E3 at the right lower end portion of the input surface 500N. The user then indicates an end point on the input surface 500N by setting the pen point in a non-detected state. Also in this case, suppose that the absolute coordinates of the position S3 on the input surface 500N are (30, 20), and that the absolute coordinates of the position E3 on the input surface 500N are (230, 120). Hence, as illustrated on the right side of FIG. 3D, a movement from the position S3 (30, 20) to the position E3 (230, 120) is performed, which constitutes an operation of indicating the movement of the pen point within the input area Nr by a difference Δ (200, 100), which is obtained by subtracting the position S3 from the position E3.

Last Non-Detection Movement in Present Example: Region Movement (not Illustrated)

Finally, though not illustrated in the figures, the user moves the pen point of the electronic pen 600 away from the input surface 500N, to thereby set the pen point of the electronic pen 600 in a state undetectable by the tablet 500. The user then moves the pen point of the electronic pen 600 to the left upper end portion of the input surface 500N. As a result of the operations thus far, the input area Nr has further been moved according to the moving indication of the pen point of the electronic pen 600. Hence, a new origin position P3 of the input area Nr, on the output absolute coordinate region VI, obtained after the movement is a position obtained by adding a difference Δ (200, 100) as relative coordinates to the origin P2 (400, 200) of the present input area on the output absolute coordinate region VI. Specifically, as illustrated in FIG. 3A, the new origin position P3 of the input area Nr, on the output absolute coordinate region VI, obtained after the movement is (600, 300). Incidentally, supposing that the coordinates of a position indicated by the pen point of the electronic pen 600 in this case is (30, 20) on the tablet (on the input surface 500N), the coordinates of the position on the output absolute coordinate region VI are (630, 320).

Thus, the input area Nr corresponding to the input surface 500N of the tablet 500 can be positioned at the right lower end portion of the output absolute coordinate region VI. According to such processing in the tablet 500, a new output absolute coordinate value obtained by adding a present relative coordinate value (difference Δ) on the input surface 500N to a present output absolute coordinate value is output from the tablet 500, and is supplied to the PC main unit 100. In this case, the movement of the electronic pen 600 is a hovering movement not involving a pen pressure, and therefore does not constitute an input of handwriting.

Hence, the PC main unit 100 sequentially changes a cursor position displayed on the display screen 200D of the display 200 on the basis of the output absolute coordinate value from the tablet 500. The PC main unit 100 ultimately displays the cursor in the vicinity of the position at which absolute coordinates are (600, 300) on the display screen 200D. Thus, the input range display area Ar corresponding to the input area Nr can be moved on the display screen 200D. This is because the output absolute coordinate region VI is a region associated with the display screen 200D of the display 200, as also described above.

Information Input Through Input Surface 500N and Display on Display Screen 200D

FIGS. 4A to 4D are diagrams of assistance in explaining input processing performed in the information processing system according to the embodiment and display processing corresponding to this input processing. In the example illustrated in FIGS. 4A to 4D, in order to simplify the description, suppose that the display screen 200D of the display 200 which display screen is associated with the output absolute coordinate region VI is a region of horizontal 900 pixels by vertical 500 pixels. In addition, also in the example illustrated in FIGS. 4A to 4D, suppose that the input surface 500N of the tablet 500 is a region of horizontal 250 pixels by vertical 150 pixels. In addition, in the example illustrated in FIGS. 4A to 4D, suppose that the input range display area Ar corresponding to the input area Nr is positioned at the right lower end portion of the display screen 200D by the processing of moving the input area Nr on the output absolute coordinate region VI as described with reference to FIGS. 3A to 3D. Hence, an origin AP of the input range display area Ar positioned at the right lower end portion of the display screen 200D is (600, 300) as in the case of the input area Nr described with reference to FIGS. 3A to 3D. That is, a relation between the output absolute coordinate region VI and the input area Nr described with reference to FIGS. 3A to 3D holds as it is as a relation between the display screen 200D of the display 200 and the input range display area Ar.

In this case, consideration will be given to a writing input of a large character "A" by using the whole of the input surface 500N of the tablet 500. First, as illustrated in FIG. 4B, the user indicates a start point by bringing the pen point of the electronic pen 600 into contact with (applying a pen pressure to) a position D1 at a central portion of an upper end of the input surface 500N of the tablet 500. Next, the user moves the pen point of the electronic pen 600 to a position D2 at a lower left end portion of the input surface 500N while holding the pen point of the electronic pen 600 in contact with the input surface 500N (continuing to apply the pen pressure). The user then moves the pen point of the electronic pen 600 away from the input surface 500N. In this case, suppose that the absolute coordinates of the position D1 on the input surface 500N are (130, 20), and that the absolute coordinates of the position D2 on the input surface 500N are (50, 130).

An operation of thus bringing the pen point into contact with the start position and moving the pen point to the end position while holding the pen point in contact is a writing input operation. In this case, as illustrated on the right side of FIG. 4B, a writing input from the position D1 (130, 20) to the position D2 (50, 130) is performed, and therefore, a difference Δ (−80, 110) obtained by subtracting the position D1 from the position D2 is a change amount (relative coordinates) from the position D1 to the position D2. The operation and processing on the input surface 500N of the tablet 500 have been performed thus far. However, the input area Nr corresponding to the input surface 500N is positioned at the right lower end portion of the output absolute coordinate region VI, as described with reference to FIGS. 3A to 3D.

Figure 4A:
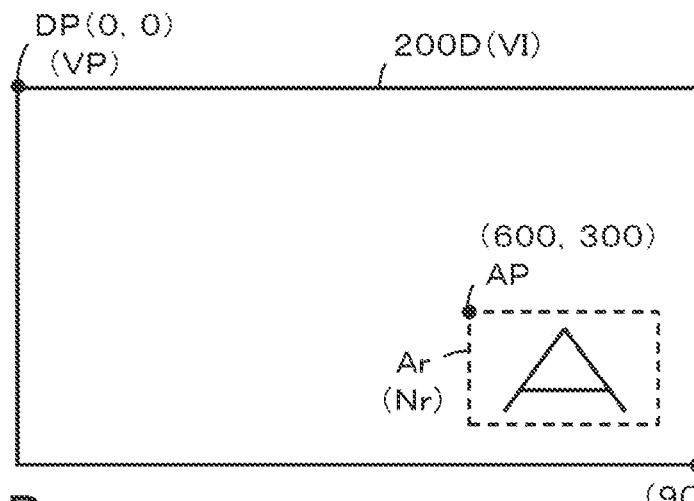
FIGS. 4A, 4B, 4C, and 4D are diagrams of assistance in explaining input processing performed in the information processing system according to an embodiment of the present disclosure and display processing corresponding to the input processing.
Figure 4B:
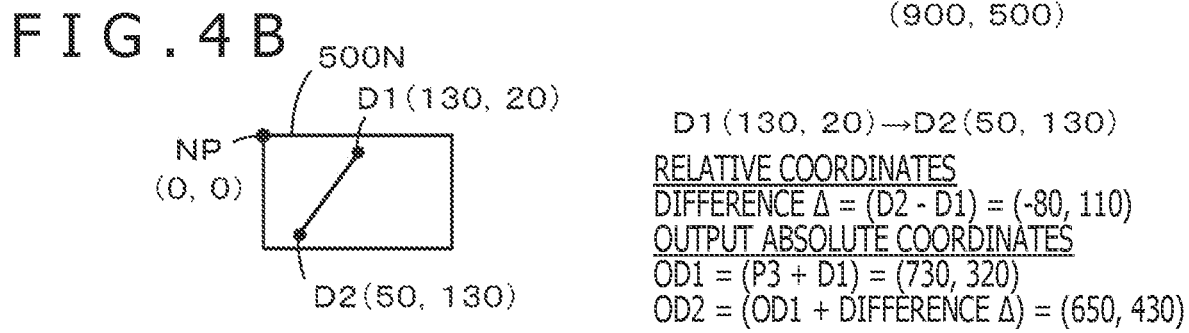

In correspondence with this, as illustrated in FIG. 4A, the input range display area Ar corresponding to the input area Nr is positioned at the right lower end portion on the display screen 200D with which the output absolute coordinate region VI is associated. Therefore, the writing input operation performed on the input surface 500N needs to be converted into an operation on the output absolute coordinate region VI. Accordingly, first, the position D1 on the input surface 500N is converted into a position OD1 on the output absolute coordinate region VI. As illustrated on the right side of FIG. 4B, the position OD1 is obtained by adding the position D1 (130, 20) on the input surface 500N to the origin P3 (600, 300) of the input area Nr on the output absolute coordinate region VI. The position OD1 is (730, 320).

Next, the position D2 on the input surface 500N is converted into a position OD2 on the output absolute coordinate region VI. For the position OD2, as illustrated on the right side of FIG. 4B, it suffices to add the change amount from the position D1 to the position D2 on the input surface 500N, that is, the difference Δ (relative coordinates) obtained by subtracting the position D1 from the position D2, to the position OD1 on the output absolute coordinate region VI. Hence, the position OD2 on the output absolute coordinate region VI is (650, 430). The thus obtained output absolute coordinate values OD1 (730, 320) and OD2 (650, 430) are output to the PC main unit 100 together with pen pressure information, and rendering and display corresponding to the writing input are performed in the input range display area Ar of the display screen 200D.

Figure 4C:
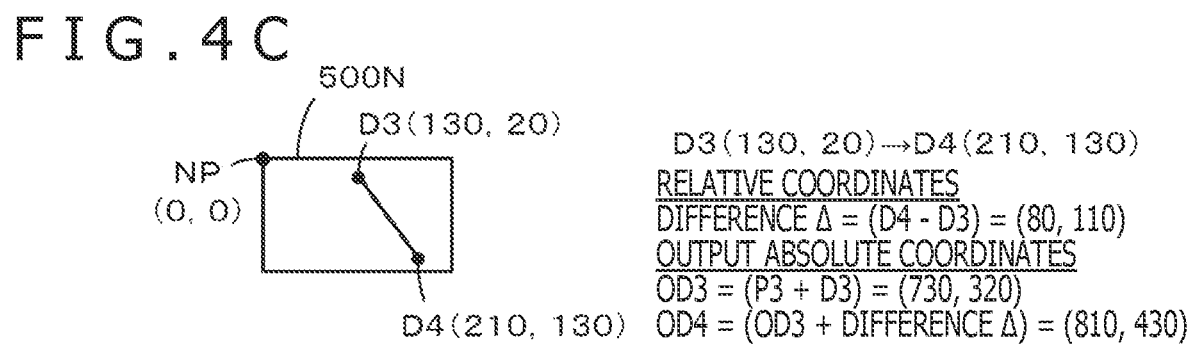
Figure 4D:
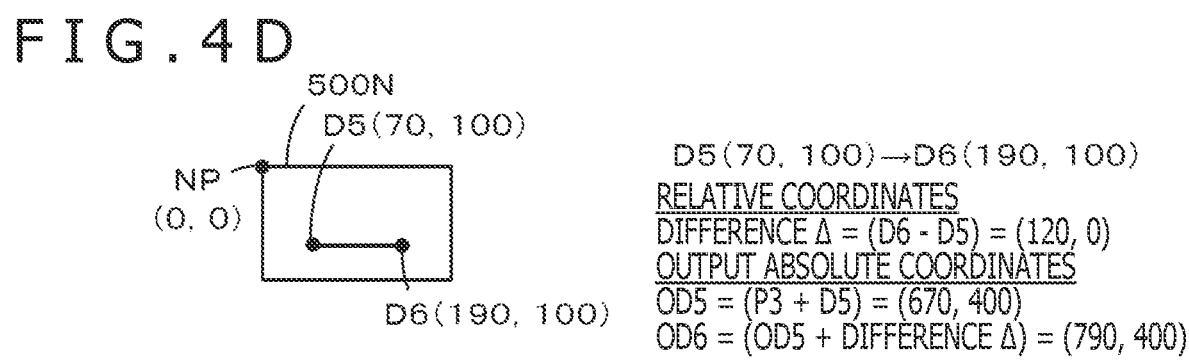

Similarly, as illustrated in FIGS. 4C and 4D, writing inputs to the input surface 500N of the tablet 500 are performed by using the electronic pen 600, to thereby obtain relative coordinates on the input surface 500N which relative coordinates correspond to the writing inputs. In addition, the absolute coordinates of the input area Nr corresponding to the input surface 500N on the output absolute coordinate region VI are recognized according to the processing of moving the input area Nr as described with reference to FIGS. 3A to 3D. Therefore, output absolute coordinates are obtained on the basis of the relative coordinates corresponding to the writing inputs and the absolute coordinates of the input area Nr on the output absolute coordinate region VI. The output absolute coordinates are output to the PC main unit 100 together with the pen pressure information, and rendering and display corresponding to the writing inputs are performed in the input range display area Ar of the display screen 200D.

When the writing inputs of FIGS. 4B, 4C, and 4D are performed, the PC main unit 100 performs rendering and display in the input range display area Ar of the display screen 200D of the display 200 on the basis of the output absolute coordinate values and the pen pressure information from the tablet 500, as illustrated in FIG. 4A. In the case of the present example, as illustrated in FIG. 4A, the character "A" is rendered and displayed in the input range display area Ar at the right lower end portion of the display screen 200D of the display 200. In this case, as also described above, operation inputs on the input surface 500N of the tablet 500 are recognized as relative coordinates.

An operation input on the input surface 500N of the tablet 500 is recognized by relative coordinates, which are recognized as a difference (change amount) obtained by subtracting present absolute coordinates from previous absolute coordinates. However, the operation input to the input surface 500N is converted into output absolute coordinate values, which are supplied to the PC main unit 100 and can be processed by the HID-compliant tablet driver. Consequently, also in the input range display area Ar of the display screen 200D, rendering and display can be performed according to the operation input recognized as relative coordinates on the input surface 500N, and an inconvenience such as distortion of a display image with respect to an input image does not occur.

Example of Configuration of Tablet 500
General Configuration of Tablet 500

Figure 5:
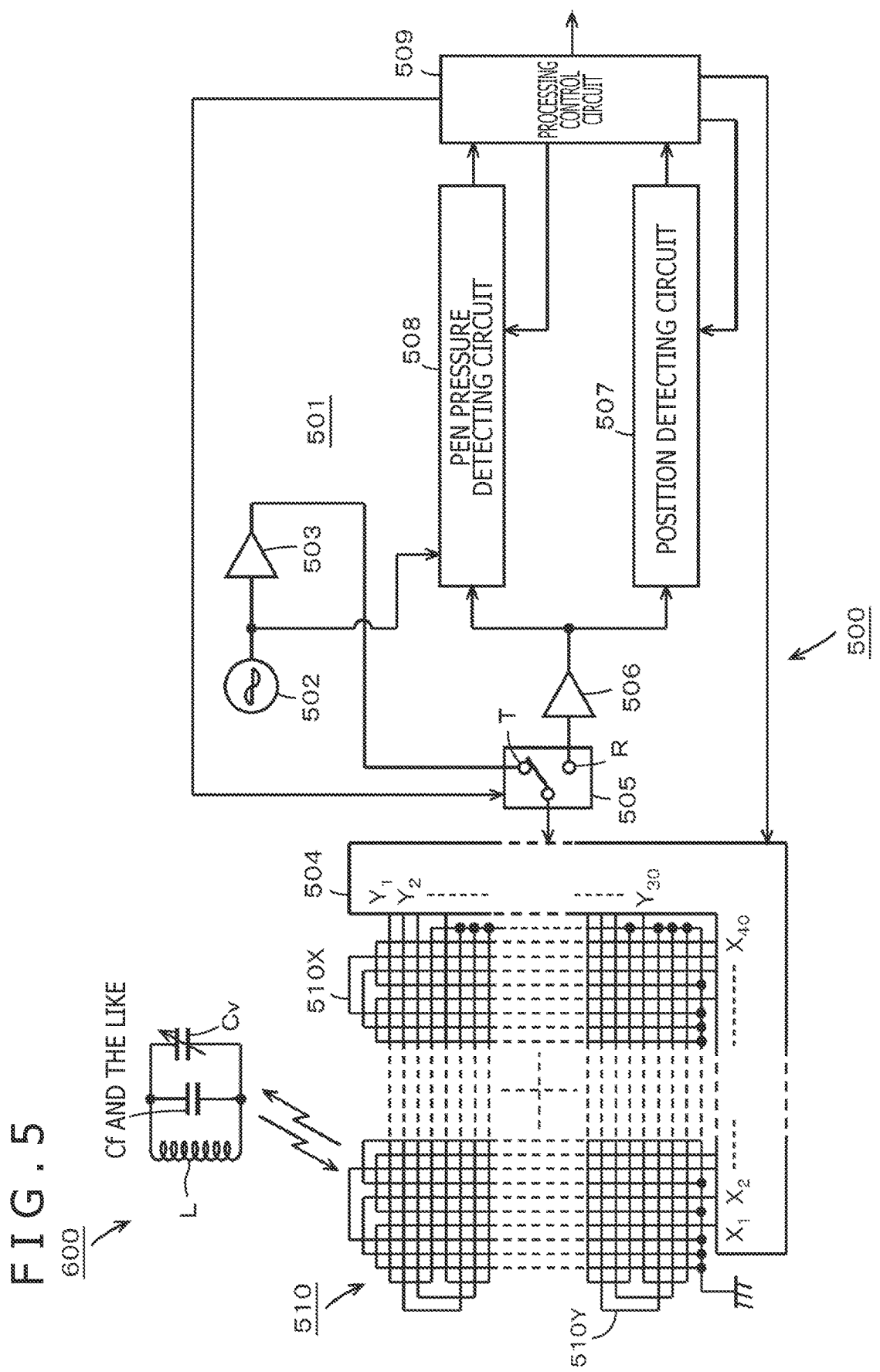
FIG. 5 is a diagram of assistance in explaining an example of a configuration of the tablet according to an embodiment of the present disclosure.

Description will next be made of an example of a configuration of the tablet 500 functioning as described with reference to FIGS. 1 to 4D. FIG. 5 is a diagram of assistance in explaining the example of the configuration of the tablet 500 of the electromagnetic induction type according to the embodiment. The electronic pen 600 illustrated at an upper left of FIG. 5 is of the electromagnetic induction type. The electronic pen 600 includes a resonance circuit formed by parallel connection of a coil L for sending and receiving signals, a pen pressure detecting unit Cv as a variable capacitance capacitor, a resonance capacitor Cf, and the like.

The tablet 500 includes a sensor unit (position detecting sensor) 510 formed by laminating an X-axis direction loop coil group 510X and a Y-axis direction loop coil group 510Y with an insulating layer provided therebetween. Each of loop coils $X_1, X_2, \ldots, X_{40}$ of the X-axis direction loop coil group 510X and loop coils $Y_1, Y_2, \ldots, Y_{30}$ of the Y-axis direction loop coil group 510Y may have one turn or may have two turns or more, that is, a plurality of turns. Such a sensor unit 510 is disposed within a tablet casing and is connected to a position detecting circuit 501 similarly disposed within the tablet casing, thereby forming the tablet 500 of a plate-shaped body as a whole.

The position detecting circuit 501 includes an oscillator 502, a current driver 503, a selecting circuit 504, a switching connecting circuit 505, a receiving amplifier 506, a position detecting circuit 507, a pen pressure detecting circuit 508, and a processing control circuit 509 (e.g., CPU). As illustrated in FIG. 5, the X-axis direction loop coil group 510X and the Y-axis direction loop coil group 510Y of the sensor circuit 510 are connected to the selecting circuit 504. The selecting circuit 504 sequentially selects one loop coil of the two loop coil groups 510X and 510Y according to control of the processing control circuit 509. As will be described later in detail, the processing control circuit 509 controls the selection of the loop coil in the selecting circuit 504 and the switching of the switching connecting circuit 505, and also controls processing timing in the position detecting circuit 507 and the pen pressure detecting circuit 508.

The oscillator 502 generates an alternating-current signal of a frequency f0. The oscillator 502 supplies the generated alternating-current signal to the current driver 503 and the pen pressure detecting circuit 508. The current driver 503 converts the alternating-current signal supplied from the oscillator 502 into a current and sends out the current to the switching connecting circuit 505. Under control of the processing control circuit 509, the switching connecting circuit 505 selects a connection destination (a transmitting side terminal T or a receiving side terminal R) to which to connect the loop coil selected by the selecting circuit 504. Of these connection destinations, the transmitting side terminal T is connected with the current driver 503, and the receiving side terminal R is connected with the receiving amplifier 506.

The switching connecting circuit 505 is switched to the transmitting side terminal T side in a transmission period and is switched to the receiving side terminal R side in a reception period. Thus, in the transmission period, the loop coil supplied with the current from the current driver 503 through the transmitting side terminal T generates a magnetic field and transmits the magnetic field to the electronic pen 600. The magnetic field acts on the resonance circuit of the electronic pen 600. In this case, the resonance circuit of the electronic pen 600 generates a position indication signal (radio wave) and transmits the position indication signal to the sensor circuit 510 side.

On the other hand, in the reception period, the loop coil selected by the selecting circuit 504 is connected to the receiving amplifier 506 through the receiving side terminal R. When the loop coil receives the action of a magnetic field from the electronic pen 600, an induced voltage is generated in the loop coil, and this induced voltage is fed to the receiving amplifier 506 via the selecting circuit 504 and the switching connecting circuit 505. The receiving amplifier 506 amplifies the induced voltage supplied from the loop coil and sends out the amplified induced voltage to the position detecting circuit 507 and the pen pressure detecting circuit 508.

Specifically, the radio wave transmitted from the electronic pen 600 generates an induced voltage in each loop coil of the X-axis direction loop coil group 510X and the Y-axis direction loop coil group 510Y. Thus, the position detecting circuit 507 detects the induced voltage (received signal) generated in the loop coil, converts the detected output signal into a digital signal, and outputs the digital signal to the processing control circuit 509. The processing control circuit 509 calculates the coordinate values of a position indicated by the electronic pen 600 in the X-axis direction and the Y-axis direction on the basis of the digital signal from the position detecting circuit 507, that is, the level of a voltage value of the induced voltage generated in each loop coil.

Meanwhile, the pen pressure detecting circuit 508 performs synchronous detection of the output signal of the receiving amplifier 506 by the alternating-current signal from the oscillator 502 and obtains a signal having a level corresponding to a phase difference (frequency shift) between these signals. In this case, the pen pressure detecting circuit 508 converts the signal corresponding to the phase difference (frequency shift) into a digital signal and outputs the digital signal to the processing control circuit 509. The processing control circuit 509 detects a pen pressure applied to the electronic pen 600 on the basis of the digital signal from the pen pressure detecting circuit 508, that is, the level of the signal corresponding to the phase difference (frequency shift) between the transmitted radio wave and the received radio wave.

In this manner, the position detecting circuit 501 switches between the signal transmission period and the signal reception period, drives the electronic pen 600 by supplying driving power to the electronic pen 600 in the transmission period, receives the signal from the electronic pen 600 in the reception period, and detects the indicated position and the pen pressure. The position detecting circuit 501 has a configuration on a circuit board. Thus, the tablet 500 can be realized by connecting a cable portion of the sensor circuit 510 to the position detecting circuit 501 having the configuration on the circuit board.

Example of Configuration of Processing Control Circuit 509 of Position Detecting Circuit 501

FIG. 6 is a block diagram of assistance in explaining an example of a configuration of the processing control circuit 509 of the position detecting circuit 501 of the tablet 500 according to the embodiment. As illustrated in FIG. 6, the processing control circuit 509 includes a control circuit 910 including a central processing unit (CPU) 901, a read only memory (ROM) 902, a random access memory (RAM) 903, and a nonvolatile memory 904. In one or more embodiments, one or more of the circuits shown in FIG. 6 are implemented by the CPU 901 executing instructions stored in the ROM 902.

A timing signal generating circuit 905 includes an oscillating circuit and the like. The timing signal generating circuit 905 generates a timing signal to be supplied to each of the selecting circuit 504, the switching connecting circuit 505, the position detecting circuit 507, and the pen pressure detecting circuit 508 under control of the control circuit 910, as also described above. The timing signal generating circuit 905, for example, generates a timing signal for performing sampling at a frequency of 500 to 1000 Hz for the X-axis direction loop coil group 510X and the Y-axis direction loop coil group 510Y constituting the sensor circuit 510. In correspondence with this, the timing signal generating circuit 905 generates timing signals to be supplied to various parts. The timing signals generated by the timing signal generating circuit 905 are supplied to the destination circuit parts through control ports 906, 907, 908, and 909.

In addition, an input port 911 receives the digital signal from the position detecting circuit 507 and supplies the digital signal to the control circuit 910. Thus, the control circuit 910 can detect the indicated position on the input surface 500N according to the digital signal from the position detecting circuit 507. In addition, an input port 912 receives the digital signal from the pen pressure detecting circuit 508 and supplies the digital signal to the control circuit 910. Thus, the control circuit 910 can detect the pen pressure applied to the electronic pen 600 by bringing the electronic pen 600 into contact with the input surface 500N, according to the digital signal from the pen pressure detecting circuit 508.

An initialization processing circuit 921 sets an output absolute coordinate value with which the origin P of the input area Nr is associated, in order to position the input area Nr corresponding to the input surface 500N on the output absolute coordinate region VI in timing of initialization immediately after the power to the tablet 500 is turned on. Specifically, as described with reference to FIGS. 3A to 3D, in a case where the origin P of the input area Nr is positioned at the origin VP of the output absolute coordinate region VI, the output absolute coordinate value with which the origin P of the input area Nr is associated is the origin VP (0, 0) of the output absolute coordinate region VI.

In addition, suppose that, after the power to the tablet 500 is turned on and the tablet 500 is used, the output absolute coordinate value indicating the position on the output absolute coordinate region VI at which position the input area Nr is positioned last is made to remain in the nonvolatile memory 904 of the control circuit 910 by what is generally called a last memory function. In this case, the initialization processing circuit 921 sets the output absolute coordinate value stored and retained in the nonvolatile memory 904 as the output absolute coordinate value with which the origin P of the input area Nr is associated. For example, suppose that the origin of the input area Nr illustrated in FIGS. 3A to 3D is positioned at P3 on the output absolute coordinate region, and that the output absolute coordinate value (600, 300) is stored and retained in the nonvolatile memory 904. In this case, the initialization processing circuit 921 sets the output absolute coordinate value with which the origin P of the input area Nr is associated, at the stored and retained output absolute coordinate value (600, 300), so that processing can be started from a state in which the input area Nr is positioned at the right lower end portion of the output absolute coordinate region VI.

A relative coordinate calculating circuit 922 sequentially obtains absolute coordinates on the input surface 500N which absolute coordinates are identified by the control circuit 910, on the basis of digital data from the position detecting circuit 507. On the basis of the obtained absolute coordinates, the relative coordinate calculating circuit 922 calculates relative coordinates indicating a position indicated by the electronic pen 600 on the input surface 500N from a difference between previous absolute coordinates and present absolute coordinates. Calculating the difference Δ on the basis of the absolute coordinates obtained last time and the absolute coordinates obtained this time as described with reference to FIGS. 3A to 3D and FIGS. 4A to 4D is a function of the relative coordinate calculating circuit 922.

An output absolute coordinate value calculating circuit 923 assumes that an indication input performed on the input surface 500N of the tablet 500 is performed on the input area Nr positioned on the output absolute coordinate region VI corresponding to the display screen 200D of the display 200, and calculates an output absolute coordinate value. That is, the output absolute coordinate value calculating circuit 923 calculates the output absolute coordinate value of an indicated position corresponding to the indication input, by using the relative coordinates from the relative coordinate calculating circuit 922.

Specifically, as described with reference to FIGS. 4A to 4D, the following is performed in a case of calculating an output absolute coordinate value corresponding to a writing start position in the input area Nr on the output absolute coordinate region VI. In this case, absolute coordinates indicating a contact position in the input area Nr (corresponding to the input surface 500N) are added to the origin (previous output absolute coordinate value) of the input area Nr on the output absolute coordinate region VI. This makes it possible to calculate the output absolute coordinate value corresponding to the writing start position in the input area Nr on the output absolute coordinate region VI.

In addition, as described with reference to FIGS. 4A to 4D, the following is performed in a case of calculating an output absolute coordinate value corresponding to a writing end position in the input area Nr on the output absolute coordinate region VI. In this case, relative coordinates obtained by subtracting the absolute coordinates of the writing start position from the absolute coordinates of the writing end position in the input area Nr (corresponding to the input surface 500N) are added to the previous output absolute coordinate value (writing start position in the case of the present example) in the input area Nr on the output absolute coordinate region VI.

Thus, the output absolute coordinate value calculating circuit 923 assumes that the indication input performed on the input surface 500N of the tablet 500 is performed on the input area Nr positioned on the output absolute coordinate region VI, and calculates the output absolute coordinate value corresponding to the indication input. Incidentally, in order to simplify description, FIGS. 4A to 4D have been described supposing that output absolute coordinate values corresponding to writing start points and writing end points are calculated in a case where the writing start points and the writing end points are known. In actuality, however, the X-axis direction loop coil group 510X and the Y-axis direction loop coil group 510Y constituting the sensor circuit 510 are sampled by the above-described timing signal having a frequency of 500 to 1000 Hz. It is therefore possible to sample the indication input finely and calculate the output absolute coordinate value corresponding to the indication input with high accuracy.

An input area movement processing circuit 924 performs processing of moving the input area Nr on the output absolute coordinate region VI on the basis of absolute coordinates indicating the indicated position on the input surface 500N from the control circuit 910 and the pen pressure information from the control circuit 910. That is, the input area movement processing circuit 924 functions when a series of operations such as an indication of a start point, a hovering or writing movement, an indication of an end point, and a non-detection movement is performed as described with reference to FIGS. 3A to 3D. Specifically, as described with reference to FIGS. 3A to 3D, when the predetermined operations are performed, the input area movement processing circuit 924 performs the processing of changing the output absolute coordinate value indicating the position on the output absolute coordinate region VI with which position the origin of the input area is associated, according to the relative coordinates from the relative coordinate calculating circuit 922.

An input-output I/F 925 enables connection to the PC main unit 100. The input-output I/F 925 receives information from the PC main unit 100, converts the information into information in a format processable in the own device, and supplies this information to the control circuit 910. In addition, the input-output I/F 925 converts information to be supplied to the PC main unit 100 into information in a transmission format and supplies this information to the PC main unit 100. The information supplied from the own device to the PC main unit 100 is not only the output absolute coordinate value and the pen pressure information described above, but also function information such as the resolution of the own device is supplied to the PC main unit 100 through the input-output I/F 925. In addition, the information supplied from the PC main unit 100 includes information regarding the aspect ratio of the display screen 200D of the display 200 connected to the PC main unit 100 and the like.

As described above, the tablet 500 according to the present embodiment recognizes input information input to the tablet 500, as relative coordinates, and the tablet 500 converts the input information into absolute coordinates and outputs the absolute coordinates to the PC main unit 100. Therefore, in a case where the input surface 500N of the tablet 500 and the display screen 200D of the display 200 do not greatly differ in aspect ratio from each other, rendered images corresponding to the input information do not greatly differ from each other. However, in a case where the input surface 500N of the tablet 500 and the display screen 200D of the display 200 greatly differ in aspect ratio from each other, the rendered images corresponding to the input information may differ from each other. An aspect ratio adjusting circuit 926 therefore performs processing of being supplied with information indicating the aspect ratio of the display screen 200D of the display 200 from the PC main unit 100, and adjusting the output absolute coordinate value to be output to the PC main unit 100.

Figure 7A:
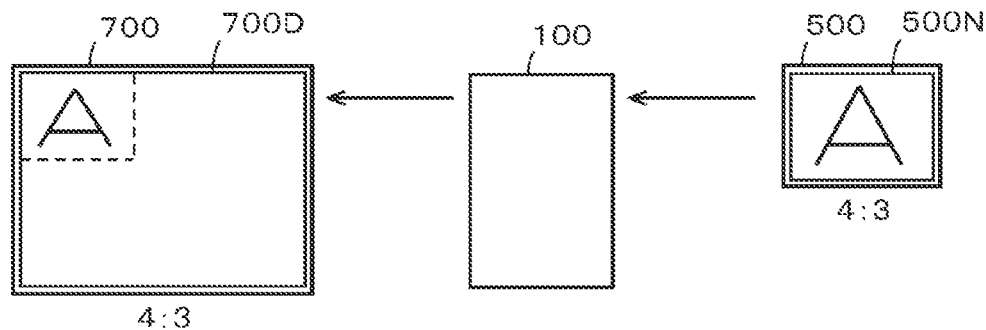
FIGS. 7A, 7B, and 7C are diagrams of assistance in explaining coordinate adjustment in a case where an input surface of the tablet and a display screen of a display greatly differ in aspect ratio from each other.
Figure 7B:
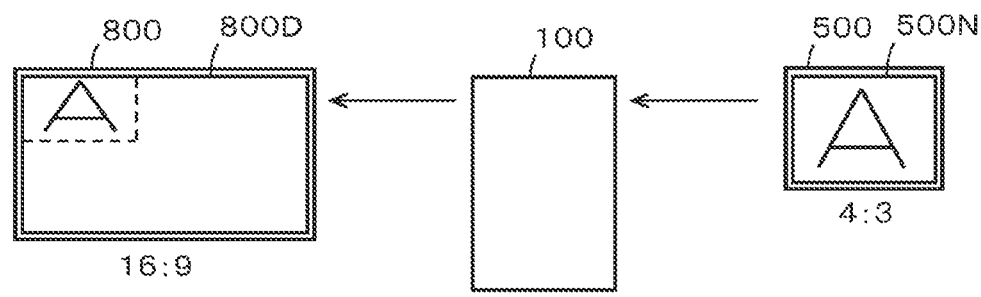
Figure 7C:
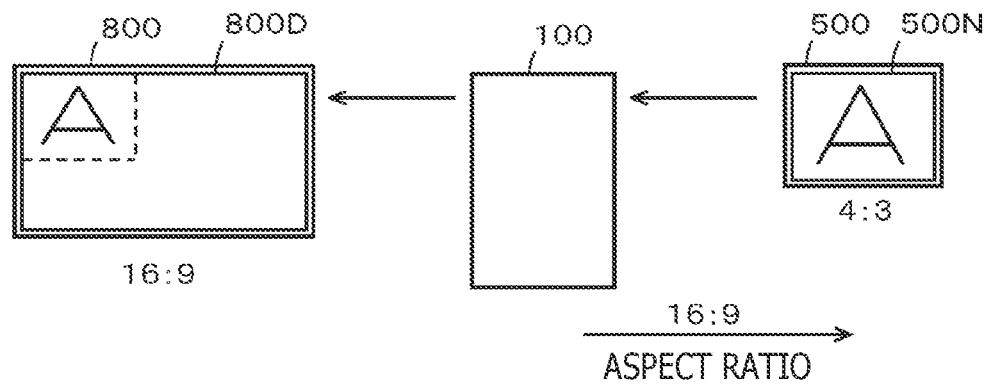

FIGS. 7A to 7C are diagrams of assistance in explaining coordinate adjustment in a case where the input surface 500N of the tablet 500 and the display screen 200D of the display 200 greatly differ in aspect ratio from each other. As illustrated in FIG. 7A, suppose that the aspect ratio of a display screen 700D of a display 700 connected to the PC main unit 100 is 4:3, and that the aspect ratio of the input surface 500N of the tablet 500 is 4:3. In this case, because the two aspect ratios are the same, a rendered image corresponding to a writing input through the input surface 500N of the tablet 500 can be displayed on the display screen 700D of the display 700 without the shape of the rendered image being changed.

However, as illustrated in FIG. 7B, suppose that the aspect ratio of a display screen 800D of a display 800 connected to the PC main unit 100 is 16:9, and that the aspect ratio of the input surface 500N of the tablet 500 is 4:3. In this case, the two aspect ratios differ from each other, and the rendered image displayed on the display screen 800D according to information that is writing-input through the input surface 500N of the tablet 500 is displayed in a state of being extended and elongated in a horizontal direction (transverse direction) and compressed and squeezed in a vertical direction.

As also described above, the PC main unit 100 can notify the tablet 500 of the aspect ratio of the display screen of the display connected to the own device. In addition, the tablet 500 recognizes the aspect ratio of the input surface 500N of the own device in, for example, the ROM 902 or the nonvolatile memory 904 of the control circuit 910. Accordingly, as illustrated in FIG. 7C, the aspect ratio adjusting circuit 926 adjusts output data on the basis of the aspect ratio of the own input surface 500N and the aspect ratio of the display screen 800D of the display 800 which aspect ratio is notified from the PC main unit 100.

The aspect ratio adjusting circuit 926 determines a compression/extension ratio in the horizontal direction and a compression/extension ratio in the vertical direction from the aspect ratio of the own input surface 500N and the aspect ratio of the display screen 800D. The compression/extension ratio in the horizontal direction is information indicating an extent of extension or contraction in the horizontal direction. The compression/extension ratio in the vertical direction is information indicating an extent of extension or contraction in the vertical direction. The aspect ratio adjusting circuit 926 adjusts the output absolute coordinate value as output data on the basis of the determined compression/extension ratio in the horizontal direction and the determined compression/extension ratio in the vertical direction. Consequently, the rendered image corresponding to the output data is prevented from being elongated or squeezed when the output data is processed in the PC main unit 100 and the rendered image is displayed on the display screen 800D of the display 800.

Incidentally, though not illustrated in FIG. 5 and FIG. 6, the processing control circuit 509 is connected with an operating unit provided with a power on/off button and other function keys or the like. When power is turned on by the power on/off button of the operating unit, power is supplied from a power supply circuit not illustrated to various parts, and the tablet 500 is set in an operating state. In addition, when the power is turned off by the power on/off button of the operating unit, the supply of the power from the power supply circuit not illustrated to the various parts is stopped, and the tablet 500 is set in a non-operating state.

Summary of Processing Performed by Tablet

Figure 8:
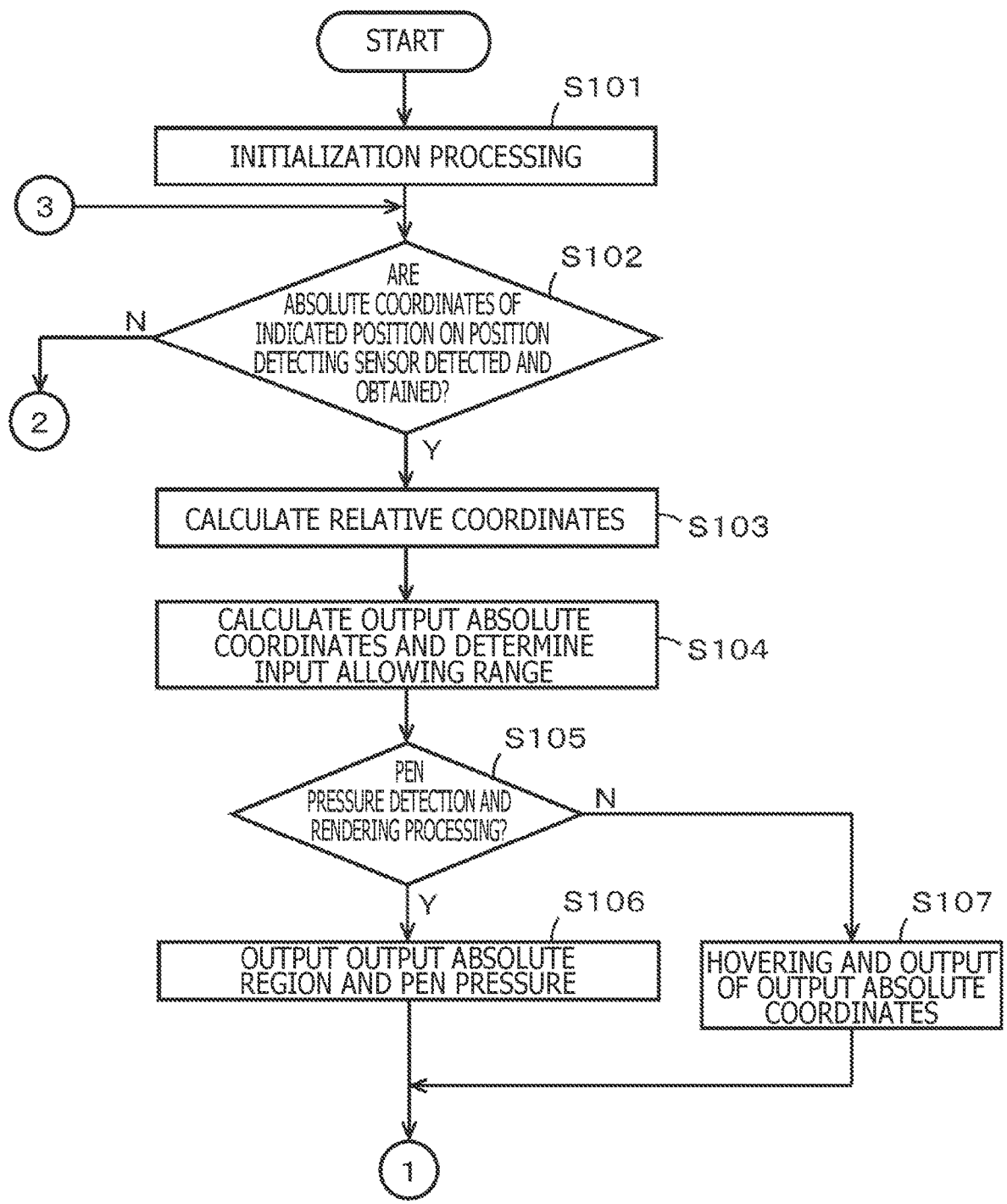
FIG. 8 is a flowchart of assistance in explaining processing performed in the tablet according to an embodiment of the present disclosure.
Figure 9:
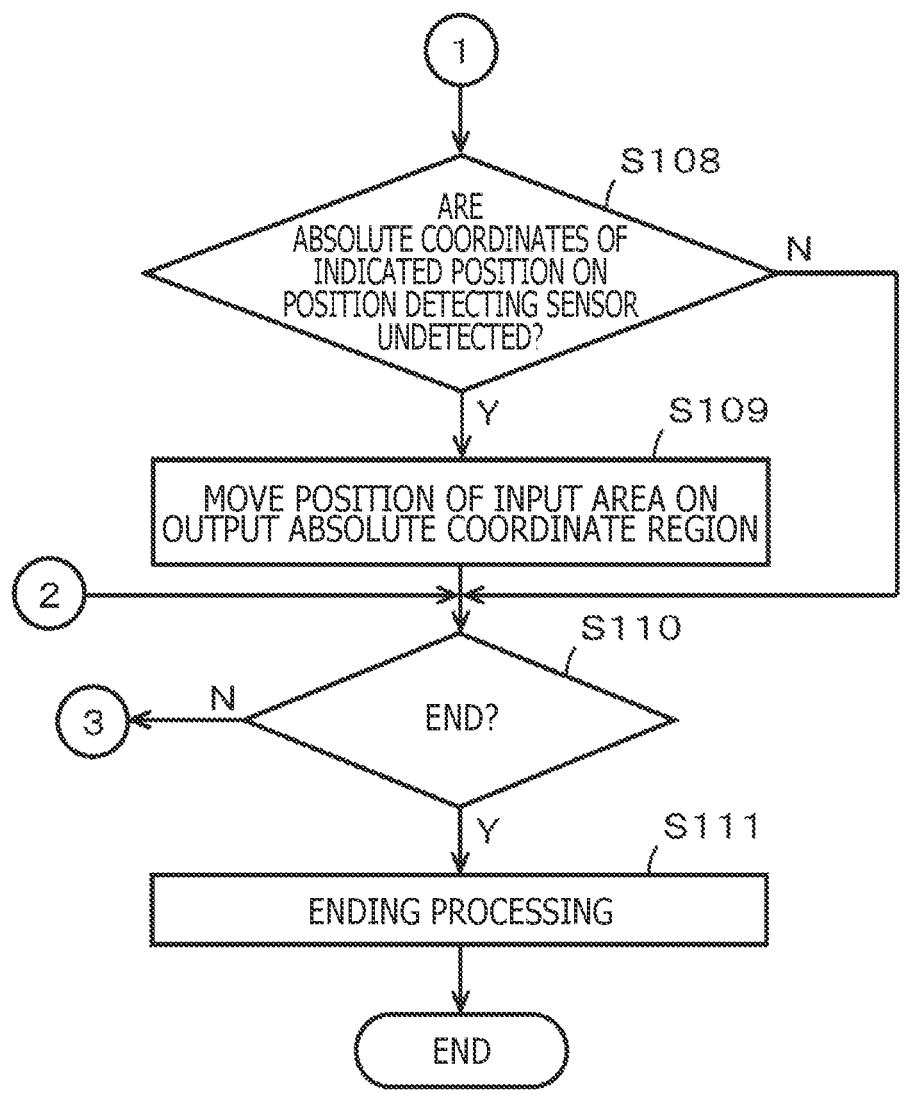
FIG. 9 is a flowchart continued from FIG. 8.

FIG. 8 and FIG. 9 illustrate a flowchart of assistance in explaining processing performed by the tablet 500 according to the embodiment. The processing illustrated in FIG. 8 and FIG. 9 is, for example, processing performed in the control circuit 910 of the processing control circuit 509 when the power to the tablet 500 is turned on. When the power is turned on, the control circuit 910 first controls the initialization processing circuit 921 to perform initialization processing (S101). The processing of S101 is processing of positioning the input area Nr corresponding to the input surface 500N of the tablet 500 on the output absolute coordinate region VI associated with the display screen 200D of the display 200. The notification of the maximum value VP (Xmax, Ymax) of the output absolute coordinate region VI to the PC main unit 100 is also performed in this timing. The initialization processing circuit 921 typically positions the origin P of the input area at the origin of the output absolute coordinate region VI, a center point of the output absolute coordinate region VI, or the position indicated by the corresponding output absolute coordinate value stored and retained in the nonvolatile memory 904, the position being a position at which the origin P of the input area is positioned immediately before the power is turned off last time.

Thereafter, the control circuit 910 controls the timing signal generating circuit 905 to generate timing signals to be supplied to various parts and supply the timing signals to the various parts through the control ports 906, 907, 908, and 909. Thus, when an indicating operation is performed by using the electronic pen 600 on the sensor circuit 510, whether or not the absolute coordinates of an indicated position on the sensor circuit 510 and a pen pressure are detected and obtained is determined (S102). The processing of S102 is performed by the functioning of the position detecting circuit 507 illustrated in FIG. 5 and the control circuit 910 of the processing control circuit 509, as well as the pen pressure detecting circuit 508 and the control circuit 910 of the processing control circuit 509 if the pen pressure is involved. When no indicated position is detected, the processing proceeds to determination of an ending operation in S110.

When the determination processing of S102 determines that an indicated position is detected, the control circuit 910 controls the relative coordinate calculating circuit 922 to perform processing of using sequentially obtained absolute coordinates and calculating relative coordinates by subtracting present absolute coordinates from previous absolute coordinates (S103). In addition, the control circuit 910 controls the output absolute coordinate value calculating circuit 923 to calculate an absolute coordinate value corresponding to the indication input and determine an input allowing range of the input area Nr at this time point (S104). This input allowing range of the input area Nr does not change until the absolute coordinates of the indicated position on the position detecting sensor become undetected at S108 in FIG. 9 to be described later. At S104, the output absolute coordinate value is sequentially calculated by using the position of the input area Nr on the output absolute coordinate region VI, a previous output absolute coordinate value if it has been calculated, and present relative coordinates from the relative coordinate calculating circuit 922, and the output absolute coordinate value is plotted on the output absolute coordinate region VI. This means constructing an output absolute coordinate region different from the absolute coordinate region of the tablet by using the relative coordinates.

Thereafter, the control circuit 910 determines whether or not the indication input received through the sensor circuit 510 is a writing input or rendering processing accompanying a pen pressure, as described with reference to FIGS. 4A to 4D (S105). Suppose that the determination processing of S105 determines that the indication input to the sensor circuit 510 is a handwriting input or rendering processing. In this case, the control circuit 910 performs processing of associating the output absolute coordinate value from the output absolute coordinate value calculating circuit 923 with the obtained pen pressure and outputting the output absolute coordinate value associated with the pen pressure to the PC main unit 100 through the input-output I/F 925 (S106).

Suppose, on the other hand, that the determination processing of S105 determines that the indication input to the sensor circuit 510 is not a handwriting input or rendering processing. In this case, the control circuit 910 controls the input area movement processing circuit 924 to determine that the indication input received through the sensor circuit 510 is a hovering moving indication, as described with reference to FIGS. 3A to 3D, and the control circuit 910 performs processing of outputting the output absolute coordinate value from the output absolute coordinate value calculating circuit 923 to the PC main unit 100 through the input-output I/F 925 (S107).

After the processing of S106 or S107, the processing proceeds to the processing of FIG. 9, and determines whether or not the absolute coordinates of the indicated position on the position detecting sensor are undetected (S108). When the determination processing of S108 determines that the absolute coordinates of the indicated position on the position detecting sensor are undetected, the input area movement processing circuit 924 performs processing of moving the position of the input area Nr on the output absolute coordinate region VI under control of the control circuit 910 (S109). However, at this time point, the range of the input area Nr is still indeterminate.

When the determination processing of S102 determines that the absolute coordinates of the indicated position and the pen pressure are not detected, or after the processing of S109, the control circuit 910 determines whether or not an ending operation of turning off the power is performed (S110). When the determination processing of S110 determines that the ending operation is not performed, the control circuit 910 repeats the processing from S102 in FIG. 8 and continues processing of receiving a further indication input. In addition, when the determination processing of S110 determines that the ending operation is performed, the control circuit 910 performs predetermined ending processing (S111) and ends the processing illustrated in FIG. 8.

Incidentally, the predetermined ending processing performed at S111 performs various kinds of processing for preventing an inconvenience from occurring at a time of a next power start-up by, for example, storing necessary information in the nonvolatile memory 904, and then turns off the power. Hence, in a case where the last memory function is used, for example, the ending processing of S111 also includes processing of, for example, storing the position (output absolute coordinate value) of the origin of the present input area Nr on the output absolute coordinate region VI in the nonvolatile memory 904.

The input range display area Ar is provided on a part of the display screen 200D, as described with reference to FIGS. 2 to 4, by thus performing the processing illustrated in FIG. 8. Various kinds of information can be input to the input range display area Ar by using the whole of the input surface 500N of the tablet 500.

Example of Configuration of PC Main Unit

Figure 10:
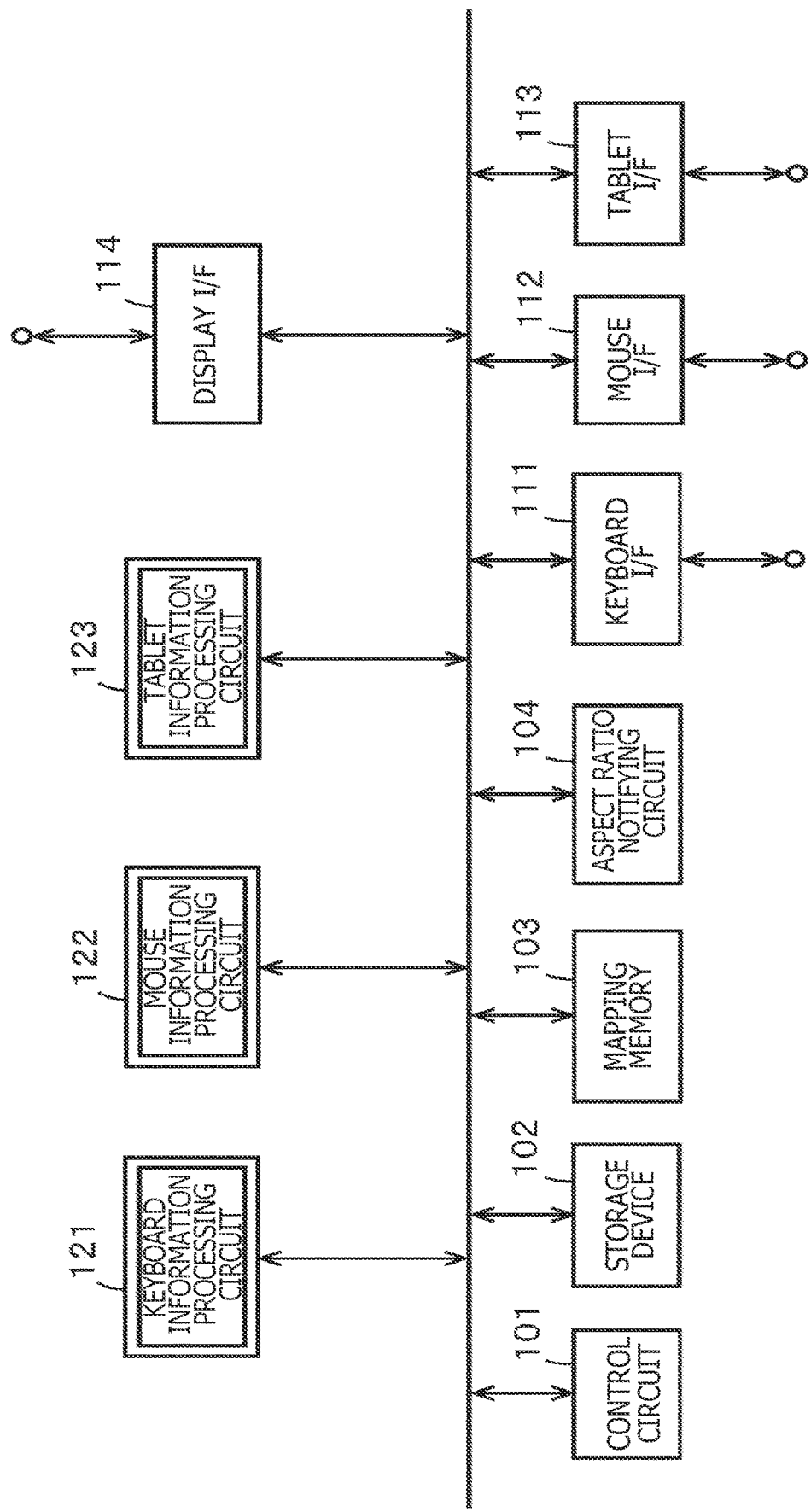
FIG. 10 is a block diagram of assistance in explaining a general configuration of a PC main unit used in the information processing system according to an embodiment of the present disclosure.
Figure 12A:
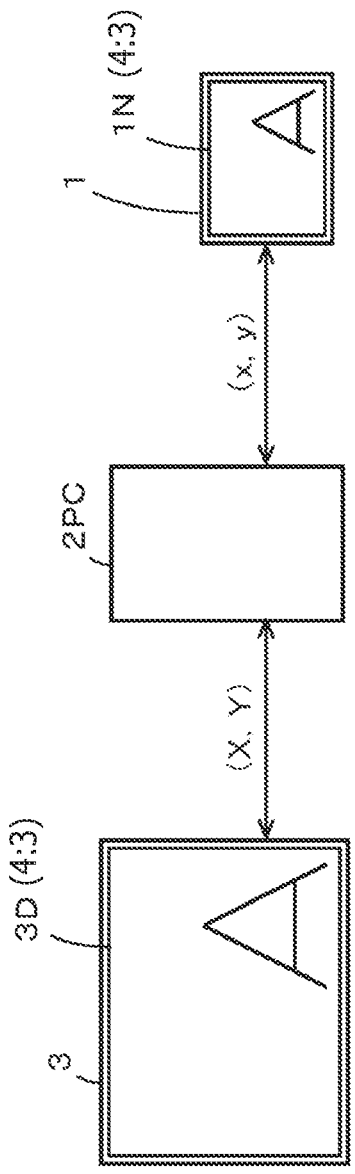
FIGS. 12A and 12B are diagrams illustrating a conventional information processing system including a tablet, a PC, and a display.
Figure 12B:
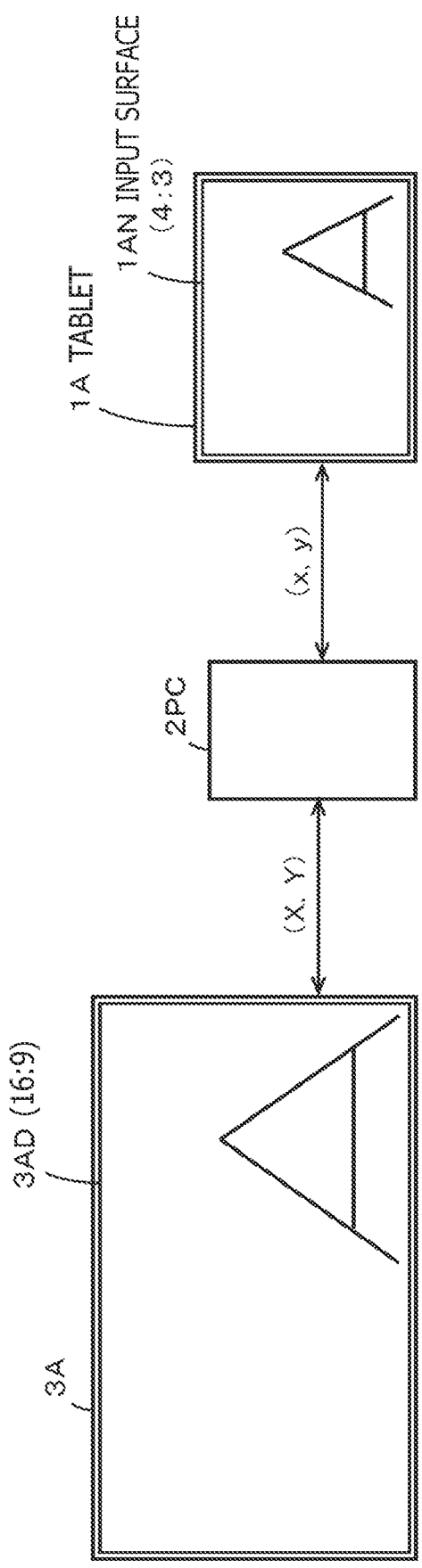

FIG. 10 is a block diagram of assistance in explaining a general configuration of the PC main unit used in the information processing system according to the embodiment. Referring to FIG. 10, description will be briefly made of an example of a configuration of the PC main unit to which the tablet 500 is connected. The PC main unit 100 includes a control circuit 101. The control circuit 101 has a microprocessor configuration in which a CPU, a ROM, a RAM, a nonvolatile memory, and the like are connected to one another through a bus. The control circuit 101 implements a function of controlling various parts of the PC main unit 100 by executing various programs. In one or more embodiments, one or more of the circuits shown in FIG. 10 are implemented by the control circuit 101 executing instructions stored in the ROM.

A storage device 102, for example, includes a recording medium such as a solid state drive (SSD) and a driver therefor. The storage device 102 has functions of data writing, readout, deletion, changes, or the like on the recording medium under control of the control circuit 101. A mapping memory 103 assigns the output absolute coordinate value from the tablet 500 to coordinates of the display screen 200D and stores and retains mapping data for forming rendering data.

An aspect ratio notifying circuit 104 performs processing of, under control of the control circuit 101, forming notification information for notifying the aspect ratio of the display screen 200D of the display 200 connected to the own device and notifying the tablet 500 of the notification information through a tablet I/F 113 to be described later. A keyboard I/F 111 enables connection of the keyboard 300 and enables transmission and reception of information to and from the keyboard 300. A mouse I/F 112 enables connection of a mouse and enables transmission and reception of information to and from the mouse 400. The tablet I/F 113 enables connection of the tablet 500 and enables transmission and reception of information to and from the tablet 500. In addition, a display I/F 114 enables connection of the display 200 and enables transmission and reception of information to and from the display 200.

A keyboard information processing circuit 121 is a circuit that receives and processes information from the keyboard 300. An HID-compliant standard keyboard driver executed by the control circuit 101 implements the functions of the keyboard information processing circuit 121. However, in FIG. 10, in order to simplify description, the keyboard information processing circuit 121 is illustrated as one block of a double line quadrangle. A mouse information processing circuit 122 is a circuit that receives and processes information from the mouse 400. An HID-compliant standard mouse driver executed by the control circuit 101 implements the functions of the mouse information processing circuit 122. However, in FIG. 10, in order to simplify description, the mouse information processing circuit 122 is illustrated as one block of a double line quadrangle.

In addition, a tablet information processing circuit 123 is a circuit that receives and processes the output absolute coordinate value, the pen pressure information, and the like from the tablet 500. An HID-compliant standard tablet driver executed by the control circuit 101 implements the functions of the tablet information processing circuit 123. However, in FIG. 10, in order to simplify description, the tablet information processing circuit 123 is illustrated as one block of a double line quadrangle. The tablet information processing circuit 123 forms rendering data for displaying information on the display screen 200D by using the output absolute coordinate value and the pen pressure information received through the tablet I/F 113 and the mapping data of the mapping memory 103. The formed rendering data is supplied to the display 200 through the display I/F 114 and is used for rendering processing. That is, the PC main unit 100 can perform rendering processing in consideration of also the pen pressure information from the tablet 500.

Thus, an ordinary PC main unit suffices as the PC main unit 100. When an HID-compliant standard tablet driver is included in the PC main unit 100, the tablet 500 can be connected as an input device to the PC main unit 100, and the PC main unit 100 can use this input device. As also described above, the tablet 500 uses a timing signal having a sampling frequency of 500 to 1000 Hz and detects an indicated position, and this indicated position is converted into an output absolute coordinate value, which is supplied to the PC main unit 100. The PC main unit 100 has a capability of processing, without delay, also the output absolute coordinate value from the tablet 500 using the sampling frequency higher than that of a conventional tablet.

Effects of Embodiment

The tablet 500 according to the foregoing embodiment is realized as a very small tablet. The tablet 500 does not need a dedicated driver, and can therefore easily be connected to an information processing device such as a PC including the HID-compliant tablet driver and start to be used immediately. Further, even an input of information to a part of the display screen can be performed by using the whole of the input surface 500N of the tablet 500. In addition, because an operation input on the input surface of the tablet 500 is recognized as relative coordinates, occurrence of distortions or the like when the operation input is displayed on the display screen can be reduced.

In addition, by being provided with the aspect ratio of the display screen of the display from the information processing device such as a PC to which the tablet 500 is connected, the tablet 500 can make an adjustment in such a manner as not to cause an inconvenience such as a distortion occurring from a difference between the aspect ratio of the display screen of the display and the aspect ratio of the display surface of the own device. In addition, because the tablet 500 has a small size, it is not difficult, for example, to find a storage space for the tablet 500 even in a case where the tablet 500 is used in conjunction with peripheral devices such as a keyboard and a mouse. The tablet 500 can be installed and used at a position where the user uses the tablet 500 easily.

Modifications

Switching Between Input Area Movement Mode and Rendering Mode

In the tablet 500 according to the foregoing embodiment, the range of the input area is determined at a time point at which the pen point is detected, a linear distance until the pen point becomes undetected is processed as an input area moving indication, and an indication input accompanying a pen pressure is processed as a writing input. However, there is no limitation to this. For example, separately from the writing input, a series of operations such as an indication of a start point by bringing the pen point into contact with the tablet 500, a hovering movement of the pen point, an indication of an end point by bringing the pen point into contact with the tablet 500, and a non-detection movement of the pen point may be processed as an input area moving indication, and an indication input accompanying a pen pressure may be processed as a writing input. Alternatively, for example, a mode switching button may be provided to the tablet 500, and switching between an input area moving indication mode and a writing indication mode may be performed by operating the mode switching button. The mode switching button is, for example, connected to the processing control circuit 509 illustrated in FIG. 6. The processing control circuit 509 can thereby switch the own device between the input area moving indication mode and the writing indication mode according to a depressing operation of the mode switching button.

Then, at a time of the input area moving indication mode, even when an indication input that moves between a start point and an end point while applying a pen pressure is performed, it suffices to move the input area with the difference Δ from the end point to the start point as moving indication information, as described with reference to FIGS. 3A to 3D. Hence, at the time of the input area moving indication mode, pen pressure information is not supplied to the PC main unit 100. In addition, at a time of the writing indication mode, as in the case of the tablet 500 according to the foregoing embodiment, an indication input is recognized as an amount of change on the basis of relative coordinates as a difference Δ between absolute coordinates on the input surface. However, the relative coordinates are converted into an output absolute coordinate value, and the output absolute coordinate value is supplied to the PC main unit 100. The output absolute coordinate value is therefore information processable by the HID-compliant standard tablet driver of the PC main unit 100, so that rendering corresponding to the writing input can be performed.

Transmission and Reception of Information Between PC Main Unit 100 and Tablet 500

Incidentally, in the foregoing embodiment, description has been made supposing that the output absolute coordinate value and the pen pressure information are transmitted from the tablet 500 to the PC main unit 100. In addition, description has been made supposing that the aspect ratio of the display screen 200D of the display 200 can be notified from the PC main unit 100 to the tablet 500. However, there is no limitation to this. As in the conventional case, for example, necessary information such as the resolution of the tablet 500 is supplied from the tablet 500 to the PC main unit 100. Incidentally, the resolution is a numerical value indicating the density of pixels in a bitmap image. In other words, the resolution is the fineness of a grid representing the image and is generally expressed by a number according to how many parts one inch is divided into.

Information Processing Device Other than PC Main Unit 100

In addition, the tablet 500 can be connected not only to the PC main unit 100 but also to various information processing devices to which a tablet needs to be connected as an input device, the information processing devices being, for example, a notebook PC, a tablet PC, a smart phone, and the like.

Provisions for Size

In addition, in the foregoing embodiment, description has been made supposing that the display screen 200D of the display 200 is, for example, a horizontally long 21-inch display screen (aspect ratio of 16:9), and that the input surface 500N of the tablet 500 is, for example, an input surface of the A5 size. However, there is no limitation to this. The size of the display screen and the input surface can be set to be various sizes. The size of the input area Nr and the input range display area Ar can be determined according to the size of the input surface 500N of the tablet 500. In addition, the dimensions (size) of the output absolute coordinate region may be determined according to the size of the display screen of the display connected to the information processing device.

Combined Use of Tablet 500 and Mouse 400

FIG. 11 is a diagram of assistance in explaining a combined use of the tablet 500 and the mouse 400. In a case of a conventional information processing system including a mouse and a tablet as pointing devices, the mouse and the tablet have the same basic function of being able to indicate a target position on a screen. Hence, a PC main unit of the conventional information processing system manages a position indicated by the mouse and a position indicated by an electronic pen through the tablet as positions indicated by pointing devices without distinction. Therefore, an icon displayed on the display screen can be selected both by an indicating operation using the mouse and by an indicating operation using the electronic pen through the tablet.

Also in the information processing system according to the foregoing embodiment (hereinafter described simply as the information processing system according to the embodiment), as described with reference to FIG. 1, the mouse 400 and the tablet 500 are connected as pointing devices to the PC main unit 100. Hence, also in the information processing system according to the embodiment, basically, any position on the display screen 200D of the display 200 can be indicated both by using the mouse 400 and by an indication using the electronic pen 600 on the input surface 500N of the tablet 500.

However, in the case of the information processing system according to the embodiment, as described above, an input operation using the tablet 500 and the electronic pen 600 is performed on the input range display area Ar positioned on the display screen 200D of the display 200, as illustrated in FIG. 11. That is, as described with reference to FIGS. 3A to 3D, the input range display area Ar corresponds to the input area Nr in a case where the input area Nr corresponding to the input surface 500N is moved and positioned at a certain position on the virtual output absolute coordinate region VI. Therefore, a position indication using the mouse 400 and a position indication using the electronic pen 600 through the tablet 500 are handled in coordinate systems in which the management of a cursor CS in the PC main unit 100 is different.

Here, consideration will be given to a case where the information processing system according to the embodiment is used, and, for example, a signature is writing-input in the input range display area Ar of the display screen 200D by the electronic pen 600 through the tablet 500, as illustrated in FIG. 11. Suppose that, in the middle of a writing input of, for example, "Wacomu Taro" as the signature, and at a time at which the pen point of the electronic pen 600 is at a position P as illustrated in FIG. 11, a part or the whole of the writing-input signature is desired to be redrawn. In this case, a transition is made from a state of a rendering mode to an eraser mode (erasing mode) by performing an operation of selecting an eraser button ES of a tool bar Br displayed on an upper end side of the display screen 200D, and a part desired to be erased is indicated by the electronic pen 600 and erased.

As also described above, in the information processing system according to the embodiment, a region in which a position indication using the electronic pen 600 is possible is only within the input range display area Ar on the display screen 200D. Therefore, in order to select the eraser button ES by the electronic pen 600, the input range display area Ar is moved to a position including the eraser button ES, as indicated by an arrow AW1 in FIG. 11, by performing an operation of moving the input area Nr (corresponding to the input range display area Ar) described with reference to FIGS. 3A to 3D. When the eraser button ES is included within the input range display area Ar, the selection of the eraser button ES by the electronic pen 600 becomes possible. When the eraser button ES is selected, the PC main unit 100 changes an operation state to the eraser mode.

In this case, the position at which the characters a part or the whole of which is desired to be erased are input is the right lower end portion of the display screen 200D. Therefore, an operation of moving the input range display area Ar present at the position including the eraser button ES to the right lower end portion of the display screen 200D again is performed, as indicated by an arrow AW2 in FIG. 11, by performing an operation of moving the input area Nr (corresponding to the input range display area Ar) described with reference to FIGS. 3A to 3D. It is not until this series of operations is performed that a part or the whole of the already input characters "Wacomu" can be erased by using the electronic pen 600.

Then, after a part or the whole of the input characters "Wacomu" is erased, the input range display area Ar is moved to the position including the eraser button ES again, as indicated by the arrow AW1. Next, the eraser mode is cleared by selecting the eraser button ES by the electronic pen 600, and a transition is made to the rendering mode. Further, as indicated by the arrow AW2, the input range display area Ar is moved to the right lower end portion of the display screen 200D again, and a writing input of the signature to the right lower end portion of the display screen 200D can be performed again. Thus, in order to switch between the eraser mode and the rendering mode according to an indicating operation using the electronic pen 600 on the tablet 500, the input range display area Ar needs to be moved multiple times, which is a very troublesome operation.

Accordingly, as illustrated in FIG. 11, the mouse cursor CS is moved to the display position of the eraser button ES by using the mouse 400, and a transition can be made to the eraser mode by selecting the eraser button ES through a left click operation of the mouse 400. In order to end the eraser mode, it suffices to position the mouse cursor CS to the display position of the eraser button ES by using the mouse 400 and perform a left click operation of the mouse 400 again.

However, in a case where the tablet 500 is handled as a relative coordinate control device, that is, as a mouse, as is commonly performed, the PC main unit 100 manages a position indicated by the mouse 400 and an indicated position indicated by making the tablet 500 detect the electronic pen 600, without distinction. Therefore, when a position is indicated by using the mouse 400, the position becomes a final indicated position, and the PC main unit 100 cannot recognize the position P as a final indicated position within the input range display area Ar positioned within the display screen 200D. This precludes resumption of an indication input within the input range display area Ar by using the tablet 500 and the electronic pen 600. Accordingly, the PC main unit 100 is enabled to manage the mouse cursor CS and the position indicated by the electronic pen 600 separately from each other.

Specifically, at least the absolute coordinate value of the origin of an immediately previous input area Nr (corresponding to the input range display area Ar) on the output absolute coordinate region VI is retained in, for example, the nonvolatile memory 904 of the processing control unit 509 of the tablet 500. Thus, in a case where an operation is performed on the input surface 500N of the tablet 500 by the electronic pen 600, relative coordinates corresponding to the input operation are calculated with the retained origin of the immediately previous input area Nr as a reference, the relative coordinates are converted into output absolute coordinates, and the output absolute coordinates are output. Thus, a writing input can be performed in a continuous manner in the immediately previous input area Nr (corresponding to the input range display area Ar).

That is, when the mouse 400 is used, an indication input can be performed by positioning the mouse cursor CS at any position on the display screen 200D. Further, when the electronic pen 600 is used, a writing input can always be performed in the input range display area Ar positioned at a predetermined position on the display screen 200D by the user, through the tablet 500. Incidentally, not only the absolute coordinate value of the origin of the immediately previous input area Nr (corresponding to the input range display area Ar) on the output absolute coordinate region VI but also an absolute coordinate value corresponding to a final indicated position may be retained in the nonvolatile memory 904. In this case, when the writing input is resumed, it is possible to obtain relative coordinates with the final indicated position as a reference and convert the relative coordinates into an output absolute coordinate value.

Other Modifications

In addition, in regard to the tablet 500 according to the foregoing embodiment, a time of turning on power has been described as initialization timing. However, there is no limitation to this. For example, in a case where a reset button is provided to the tablet 500, a time of a depressing operation of the reset button can also be set as initialization timing. That is, various settings can be made for initialization timing.

Others

As is understood from the description of the foregoing embodiment, functions of a sensor unit in claims are implemented by the sensor circuit 510 of the tablet 500 according to the embodiment, and a position detecting circuit in claims is implemented by the position detecting circuit 507 and the processing control circuit 509 of the tablet 500. In addition, functions of a relative coordinate calculating circuit in claims are implemented by the relative coordinate calculating circuit 922 of the processing control circuit 509 of the tablet 500, and functions of an output absolute coordinate value calculating circuit in claims are implemented by the output absolute coordinate value calculating circuit 923 of the processing control circuit 509 of the tablet 500. In addition, functions of an output unit in claims are implemented by the input-output I/F 925 of the processing control circuit 509 of the tablet 500.

In addition, a pen pressure detecting circuit in claims is implemented by the pen pressure detecting circuit 508 and the processing control circuit 509 of the tablet 500, and functions of an input area movement processing circuit in claims are implemented by the input area movement processing circuit 924 of the processing control circuit 509 of the tablet 500. In addition, functions of a timing signal generating circuit in claims are implemented by the timing signal generating circuit 905 of the processing control circuit 509 of the tablet 500. In addition, functions of an information receiving unit in claims are implemented by the input-output I/F 925 of the processing control circuit 509 of the tablet 500.

In addition, functions of an input unit of an information processing device in claims are implemented by the tablet I/F 113 of the PC main unit 100 according to the embodiment, and functions of an information processing circuit of the information processing device in claims are implemented by the tablet information processing circuit 123 of the PC main unit 100. In addition, functions of an information providing circuit of the information processing device in claims are implemented by the aspect ratio notifying circuit 104 and the tablet I/F 113 of the PC main unit 100. In addition, functions of an information receiving unit of a position detecting device in claims are implemented by the input-output I/F 925 of the tablet 500, and functions of an aspect ratio adjusting circuit of the position detecting device in claims are implemented by the aspect ratio adjusting circuit 926 of the processing control circuit 509 of the tablet 500.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detecting device comprising:
a sensor including a plurality of first electrodes arranged in a first direction, a plurality of second electrodes arranged in a second direction intersecting the first direction, and an input surface having a predetermined area, wherein the input surface, in operation, receives a position indication signal from an indicator, wherein the indicator, in operation, detects pen pressure information, includes the pen pressure information in the position indication signal, and transmits the position indication signal;
a position detecting circuit which, in operation, detects an indicated position corresponding to an indication input performed by the indicator on the input surface, as absolute coordinates with a predetermined position on the input surface as an origin, based on output signals from the plurality of first electrodes and the plurality of second electrodes;
a relative coordinate calculating circuit which, in operation, sequentially obtains the absolute coordinates from the position detecting circuit and calculates relative coordinates as a difference between previous absolute coordinates and present absolute coordinates;
an output absolute coordinate value calculating circuit which, in operation, assumes that the indication input is performed on an input area corresponding to the input surface, the input area being an area positioned on a predetermined output absolute coordinate region corresponding to a display screen of a display device, and calculates an output absolute coordinate value of the indicated position corresponding to the indication input by using the relative coordinates from the relative coordinate calculating circuit;
an output circuit which, in operation, outputs the output absolute coordinate value calculated by the output absolute coordinate value calculating circuit;
a pen pressure detecting circuit which, in operation, detects the pen pressure information from the indicator based on the output signals from the plurality of first electrodes and the plurality of second electrodes; and
an input area movement processing circuit which, in operation, changes an output absolute coordinate value indicating a position on the output absolute coordinate region, an origin of the input area being associated with the position, according to the relative coordinates from the relative coordinate calculating circuit in response to a determination that a predetermined input operation is performed based the absolute coordinates from the position detecting circuit and the pen pressure information from the pen pressure detecting circuit,
wherein the indicator is not detected by the position detecting circuit while the predetermined input operation is performed.

2. The position detecting device according to claim 1, further comprising:
a timing signal generating circuit which, in operation, generates a timing signal for sequentially selecting the plurality of first electrodes and the plurality of second electrodes of the sensor and supplying the output signals to the position detecting circuit,
wherein the timing signal generating circuit, in operation, generates the timing signal having a frequency of 500 to 1000 Hz.

3. The position detecting device according to claim 1, further comprising:
an information receiving circuit which, in operation, is supplied with an aspect ratio of the display screen external to the position detecting device, from an information processing device to which the position detecting device is connected; and
an aspect ratio adjusting circuit which, in operation, adjusts the output absolute coordinate value calculated by the output absolute coordinate value calculating circuit, based on the aspect ratio received through the information receiving circuit and an aspect ratio of the input surface of the position detecting device,
wherein the output circuit, in operation, outputs the output absolute coordinate value adjusted by the aspect ratio adjusting circuit.

4. The position detecting device according to claim 1, wherein:
the first electrodes and the second electrodes are formed in a loop coil configuration and the sensor is of an electromagnetic induction type, and
the sensor, in operation, is controlled such that a transmission period in which a magnetic field is generated by supplying electric power to an electrode sequentially selected from the plurality of first electrodes and the plurality of second electrodes and a reception period in which the supply of the electric power is stopped and an external magnetic field is received through an electrode sequentially selected from the plurality of first electrodes and the plurality of second electrodes are alternately provided.

5. An information processing system formed by connecting a display device and a position detecting device to an information processing device,
the position detecting device including:
a sensor including a plurality of first electrodes arranged in a first direction, a plurality of second electrodes arranged in a second direction intersecting the first direction, and an input surface having a predetermined area, wherein the input surface, in operation, receives a position indication signal from an indicator, wherein the indicator, in operation, detects pen pressure information, includes the pen pressure information in the position indication signal, and transmits the position indication signal;
a position detecting circuit which, in operation, detects an indicated position corresponding to an indication input performed by the indicator on the input surface, as absolute coordinates with a predetermined position on the input surface as an origin, based on output signals from the plurality of first electrodes and the plurality of second, electrodes;
a relative coordinate calculating circuit which, in operation, sequentially obtains the absolute coordinates from the position detecting circuit and calculates relative coordinates as a difference between previous absolute coordinates and present absolute coordinates;

an output absolute coordinate value calculating circuit which, in operation, assumes that the indication input is performed on an input area corresponding to the input surface, the input area being an area positioned on a predetermined output absolute coordinate region corresponding to a display screen of the display device, and calculates an output absolute coordinate value of the indicated position corresponding to the indication input by using the relative coordinates from the relative coordinate calculating circuit;

an output circuit which, in operation, outputs the output absolute coordinate value calculated by the output absolute coordinate value calculating circuit to the information processing device;

a pen pressure detecting circuit which, in operation, detects the pen pressure information from the indicator based on the output signals from the plurality of first electrodes and the plurality of second electrodes;

an input area movement processing circuit which, in operation, changes an output absolute coordinate value indicating a position on the output absolute coordinate region, an origin of the input area being associated with the position, according to the relative coordinates from the relative coordinate calculating circuit in response to a determination that a predetermined input operation is performed based the absolute coordinates from the position detecting circuit and the pen pressure information from the pen pressure detecting circuit;

wherein the indicator is not detected by the position detecting circuit while the predetermined input operation is performed; and the information processing device including:

an input circuit which, in operation, receives an input of the output absolute coordinate value from the position detecting device; and an information processing circuit which, in operation, forms image data for displaying, on the display screen of the display device, an image corresponding to the output absolute coordinate value received through the input circuit, and supplies the image data to the display device.

6. The information processing system according to claim 5, wherein:

the position detecting device further includes a timing signal generating circuit which, in operation, generates a timing signal for sequentially selecting the plurality of first electrodes and the plurality of second electrodes of the sensor and supplies the output signals to the position detecting circuit, the timing signal generating circuit, in operation, generates the timing signal having a frequency of 500 to 1000 Hz, and the information processing circuit of the information processing device, in operation, processes, without delay, the output absolute coordinate value supplied in a cycle of 500 to 1000 Hz from the position detecting device.

7. The information processing system according to claim 5, wherein:

the position detecting device further includes:

an information receiving circuit which, in operation, is supplied with an aspect ratio of the display screen external to the position detecting device, from the information processing device to which the position detecting device is connected, and an aspect ratio adjusting circuit which, in operation, adjusts the output absolute coordinate value calculated by the output absolute coordinate value calculating circuit, based on the aspect ratio received through the information receiving circuit and an aspect ratio of the input surface of the position detecting device, the output circuit, in operation, outputs the output absolute coordinate value adjusted by the aspect ratio adjusting circuit, and the information processing device further includes an information providing circuit which, in operation, provides the aspect ratio of the display screen of the display device connected to the information processing device to the position detecting device connected to the information processing device.

8. The information processing system according to claim 5, wherein, in the position detecting device, the first electrodes and the second electrodes are formed in a loop coil configuration and constitute the sensor of an electromagnetic induction type, and the sensor, in operation, is controlled such that a transmission period in which a magnetic field is generated by supplying electric power to an electrode sequentially selected from the plurality of first electrodes and the plurality of second electrodes and a reception period in which the supply of the electric power is stopped and an external magnetic field is received through an electrode sequentially selected from the plurality of first electrodes and the plurality of second electrodes are alternately provided.

9. The information processing system according to claim 5, wherein the predetermined input operation includes an indication of a start point, a hovering or writing movement, an indication of an end point, or a non-detection movement.

10. The position detecting device according to claim 1, wherein the predetermined input operation includes an indication of a start point, a hovering or writing movement, an indication of an end point, or a non-detection movement.

* * * * *